US009860939B2

(12) United States Patent
Di Girolamo et al.

(10) Patent No.: US 9,860,939 B2
(45) Date of Patent: Jan. 2, 2018

(54) METHOD AND APPARATUS FOR ASSISTED/COORDINATED INTRA-HOME COMMUNICATIONS

(75) Inventors: Rocco Di Girolamo, Laval (CA); Jean-Louis Gauvreau, La Prairie (CA); Zinan Lin, Melville, NY (US); Joseph M. Murray, Schwenksville, PA (US); Athmane Touag, Chomeday Laval (CA); Saad Ahmad, Montreal (CA); Martino Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 749 days.

(21) Appl. No.: 13/520,989

(22) PCT Filed: Jan. 6, 2011

(86) PCT No.: PCT/US2011/020331
§ 371 (c)(1),
(2), (4) Date: Jan. 7, 2013

(87) PCT Pub. No.: WO2011/085073
PCT Pub. Date: Jul. 14, 2011

(65) Prior Publication Data
US 2013/0142059 A1     Jun. 6, 2013

Related U.S. Application Data

(60) Provisional application No. 61/292,708, filed on Jan. 6, 2010, provisional application No. 61/393,205, filed on Oct. 14, 2010.

(51) Int. Cl.
*H04W 88/16*     (2009.01)
*H04L 12/66*     (2006.01)
(Continued)

(52) U.S. Cl.
CPC ............ *H04W 88/16* (2013.01); *H04L 12/66* (2013.01); *H04W 88/10* (2013.01); *H04W 48/12* (2013.01);
(Continued)

(58) Field of Classification Search
None
See application file for complete search history.

(56) References Cited

U.S. PATENT DOCUMENTS 8,229,368 B1 * 7/2012 Immendorf et al. ............ 455/78
8,249,031 B1 * 8/2012 Hirsch .............. H04W 72/1215
370/336

(Continued)

FOREIGN PATENT DOCUMENTS

EP    1895713 A1    3/2008
JP    2003-515965 A  5/2003
(Continued)

OTHER PUBLICATIONS

Russell, Jr. Paul L., "Addressing Unique M2M Challenges with Converged Gateways", ETSI TC M2M Workshop, Interdigital Inc., Sophia Antipolis, France, Oct. 19-20, 2010, 20 pages.
(Continued)

*Primary Examiner* — Kodzovi Acolatse
(74) *Attorney, Agent, or Firm* — Condo Roccia Koptiw LLP

(57) ABSTRACT

Systems, methods, and instrumentalities are disclosed that may provide assistance across networks using different radio access technologies. A centralized gateway CGW (210, 710) may be provided to facilitate the assistance via client devices in the networks (220). The CGW (210, 710) and client devices may use a common protocol (311) and common interface to take actions relating to the assistance (780).

16 Claims, 13 Drawing Sheets

(51) Int. Cl.
*H04W 88/10* (2009.01)
*H04W 84/10* (2009.01)
*H04W 48/12* (2009.01)
*H04W 48/18* (2009.01)
*H04W 88/06* (2009.01)

(52) U.S. Cl.
CPC ............ *H04W 48/18* (2013.01); *H04W 84/10* (2013.01); *H04W 88/06* (2013.01)

(56) References Cited

U.S. PATENT DOCUMENTS

| | | | | |
|---|---|---|---|---|
| 8,340,580 | B1* | 12/2012 | Epstein | 455/63.1 |
| 9,035,208 | B2* | 5/2015 | Warner | H01H 9/0066 200/401 |
| 2005/0078616 | A1 | 4/2005 | Nevo et al. | |
| 2005/0227692 | A1 | 10/2005 | Kawashima et al. | |
| 2006/0083187 | A1 | 4/2006 | Dekel | |
| 2007/0019575 | A1 | 1/2007 | Shaheen | |
| 2007/0104218 | A1 | 5/2007 | Hassan et al. | |
| 2008/0019334 | A1* | 1/2008 | Adams | H04W 36/20 370/338 |
| 2008/0025329 | A1* | 1/2008 | Livet et al. | 370/406 |
| 2009/0003294 | A1* | 1/2009 | Zhu et al. | 370/338 |
| 2009/0094506 | A1 | 4/2009 | Lakkis | |
| 2009/0296785 | A1* | 12/2009 | Wu | H04W 88/06 375/132 |
| 2010/0120362 | A1* | 5/2010 | Walley | H04W 16/14 455/41.2 |
| 2010/0279672 | A1* | 11/2010 | Koskela et al. | 455/418 |
| 2011/0149939 | A1* | 6/2011 | Wang | H04W 48/02 370/338 |

FOREIGN PATENT DOCUMENTS

| | | |
|---|---|---|
| JP | 2004-214893 | 7/2004 |
| JP | 2005-277815 | 10/2005 |
| JP | 2008-219221 | 9/2008 |
| JP | 2009-503931 | 1/2009 |
| JP | 2009-124500 | 6/2009 |
| JP | 2011-501483 | 1/2011 |
| KR | 2007-0011184 | 1/2007 |
| WO | WO 01/24456 A1 | 4/2001 |
| WO | WO 02/28123 A2 | 4/2002 |
| WO | WO 2006/083931 A1 | 8/2006 |
| WO | WO 2008/013878 A1 | 1/2008 |
| WO | WO 2008-123509 | 10/2008 |
| WO | WO 2009-046347 A1 | 4/2009 |

OTHER PUBLICATIONS

Thonet et al., "ZigBee—WiFi Coexistence", Schneider Electric, http://www.rexense.com, accessed Apr. 15, 2008, 38 pages.
"20 Myths of Wi-Fi Interference: Dispel Myths to Gain High-Performing and Reliable Wireless", www.cisco.com, © 2007, accessed Jan. 17, 2008, 576 pages.
Case, D., "Making Sense of the 5-GHz Regulations for Unlicensed Transmitters", www.ce-mag.com, Jul./Aug. 1999.
IEEE Standard for IEEE Std. 802.15.4, "Wireless Medium Access Control (MAC) Physical Layer (PHY) Specifications for Low-Rate Wireless Personal Area Networks (WPANs)", Sep. 2006, 26 pages.
ZigBee Alliance, Inc., ZigBee Specification, Document 053474r17, © 2007, accessed Jan. 17, 2008, 576 pages.
European Telecommunications Standards Institute (ETSI), TS 125 331, V8.4.0, "Universal Mobile Telecommunications System (UMTS); Radio Resource Control (RRC); Protocol specification (3GPP TS 25.331 version 8.4.0 Release 8)", Oct. 2008, 1542 pages.
3$^{rd}$ Generation Partnership Project (3GPP), TS 25.214, V8.8.0, 3$^{rd}$ Generation Partnership Project; Technical Specification Group Radio Access Network; Physical layer procedures (FDD), Release 8, Dec. 2009, 91pages.
RFC_3561, "Ad hoc On-Demand Distance Vector (AODV) Routing", Jul. 2003, 37 pages.

* cited by examiner

METHOD AND APPARATUS FOR ASSISTED/COORDINATED INTRA-HOME COMMUNICATIONS

CROSS-REFERENCE TO RELATED APPLICATIONS

This application is the National Stage of PCT Application No. PCT/US2011/020331, filed Jan. 6, 2011, which is based on, and claims priority to, U.S. Provisional Patent Application No. 61/292,708, filed on Jan. 6, 2010, and U.S. Provisional Patent Application No. 61/393,205, filed on Oct. 14, 2010, the contents of which are hereby incorporated by reference in their entirety.

BACKGROUND

The telecommunication landscape, within a typical home or office, may encompass a number of independently developed radio access technologies and standards. These technologies were initially designed for target applications and they perform relatively well for these applications.

SUMMARY

Systems, methods, and instrumentalities are disclosed that may provide assistance across networks using different radio access technologies. A centralized gateway (CGW) may be provided to facilitate the assistance via client devices in the networks. The CGW and client devices may use a common protocol and common interface to take actions relating to the assistance.

The CGW may collect information from a first client device over a first radio access technology using a common protocol. The CGW may fuse the information collected from the first client device with information associated with a second client device. For example, the information collected from the first client device may be combined with other information received from the second device, other devices, other networks, etc. The CGW may determine, based on the fused information, an action to be performed by the first client device over a second radio access technology to provide the assistance. The assistance may be a control function and/or an assistance service. The CGW may send an instruction, using the common protocol, to the first client device to perform the action. For example, the first client device may be associated with a first network configured to operate using a first radio access technology; and, the second client device may be associated with a second network configured to operate using a second radio access technology. The instruction may direct the first client device to activate the second radio access technology and communicate with the second client device over the second radio access technology to provide the assistance.

A client device may provide information to the CGW over a first radio access technology using a common protocol. For example, the client device may be associated with a network configured to operate using the first radio access technology. In addition, the client device may attach to the CGW and provide one or more of: the radio access technolog(ies) supported by the client device, operating mode information, location information, services/capability information, etc. The client device may receive an instruction from the CGW to perform an action over a second radio access technology to provide assistance across networks. The instruction may be received over the first radio access technology using the common protocol. The client device may perform the action over the second radio access technology. For example, the client device may provide assistance to another network configured to operate using the second radio access technology.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

FIGS. 1-12 may relate to exemplary embodiments in which the disclosed systems, methods and instrumentalities may be implemented. However, while the present invention may be described in connection with exemplary embodiments, it is not limited thereto and it is to be understood that other embodiments may be used or modifications and additions may be made to the described embodiments for performing the same function of the present invention without deviating therefrom.

Figure 1:
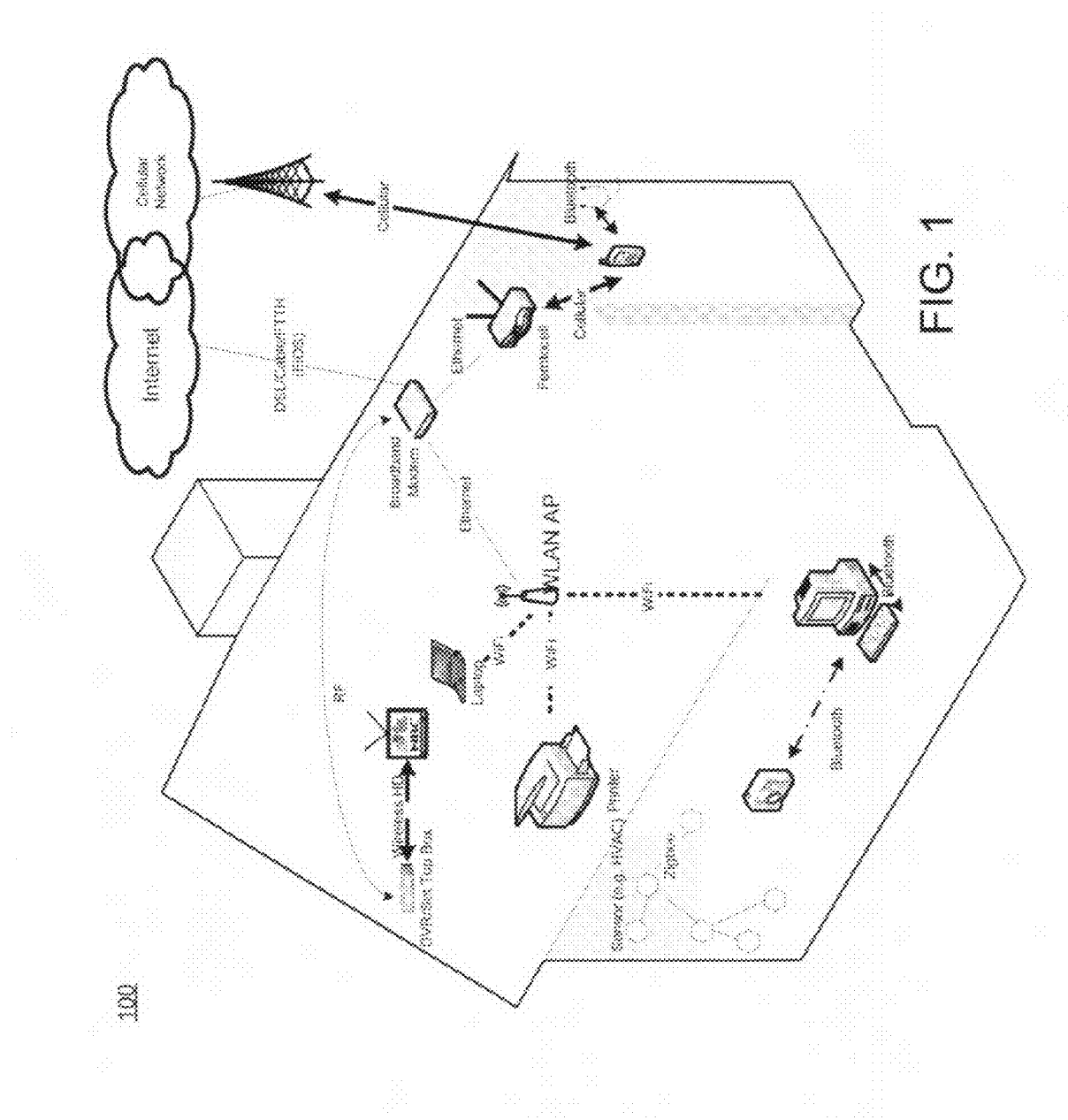
FIG. 1 illustrates a typical home network environment.

FIG. 1 illustrates a typical home network environment 100 with a sampling of these technologies. Access to content (e.g., web and video) may be provided via a broadband modem through the home owner's internet protocol (IP) backhaul connection(s) (e.g., digital subscriber line (DSL), cable, fiber to the home (FTTH), satellite, etc.). Mobile services (e.g., voice and data) are provided through the cellular network, e.g., either via a macro cell (where coverage permits), or via a femtocell. The femtocell may use the homeowner's IP backhaul to connect to the cellular network.

Wireless Local Area Network (WLAN) Access Points (APs) may provide data connectivity between PCs, laptops, and other networked devices (e.g., printers and faxes) using WIFI technology. Bluetooth links may be used for point-to-point technology (e.g., between cameras and PCs, between keyboards/mice and PCs, between mobile phones and wireless headsets). High throughput point-to-point links may be used. A typical use case for such high-speed links is for video distribution cable replacement (e.g., Set Top Box (STB) to high definition television (HDTV)). Wireless sensor networks, e.g., for monitoring of heating, ventilating and air conditioning (HVAC) systems, lighting systems, may be used.

Table 1 lists some features of each of radio access technologies. Table 1 is a high level comparison of the specific technologies in terms of four major criteria (range, peak throughput, channel bandwidth, and operating band). The channel bandwidth in Table 1 denotes the spectrum occupied by a typical transmission. The specific details for each of the technologies may be found in the relevant applicable standards.

The following observations may be made about in-home technologies, including: 1) the range of a device may depend greatly on the specific technology; 2) some technologies using unlicensed spectrum operate in the 2.4 GHz band; 3) higher data throughputs may rely on the use of the 5 GHz band and the 60 GHz band (the latter may be useful for the transmission of video traffic); 4) some technologies may require manual intervention prior to network formation (e.g., channel selection for WIFI networks); and 5) for most technologies, device discovery may be allowed either through periodic beacons or probe/request mechanisms.

A number of interferers may exist in a typical home including: cordless phones (which may have 5-10 MHz bandwidth), baby monitors, microwave ovens (some older devices emit a dirty signal over the entire 2.4 GHz band),

TABLE 1

| Technology | Relevant Standards (most typical) | Typical Range | Throughput (Peak Data Rates) | Device Requirements | Network Formation/ Device Discovery | Channel Bandwidth | Operational Frequency bands |
|---|---|---|---|---|---|---|---|
| WIFI | IEEE 802.11 Family | <100 m | 802.11a - 54 Mbps<br>802.11b - 11 Mbps<br>802.11g - 54 Mbps<br>802.11n - 600 Mbps | Portability & mobility expected | Manual selection of frequency channel in band. Access Point broadcast periodic beacon frames to allow device | 22 MHz | Unlicensed bands:<br>802.11a - 5 GHz<br>802.11b/g - 2.4 GHz<br>802.11n - 2.4 & 5 GHz |
| ZigBee | Maintained by the ZigBee Alliance. Based on IEEE 802.15.4 MAC and PHY | 70-300 m | 2.4 GHz band - 250 kbps<br>915 MHz band - 40 kbit/s<br>868 MHz band - 20 kbit/s | Low cost, low power consumption, short range Mobility not expected | Initial Channel scan by coordinator device Device discovery by Beacon search or probe request/response | 2 MHz | Unlicensed bands:<br>868 MHz in Europe,<br>915 MHz in the USA and Australia, and 2.4 GHz worldwide |
| Bluetooth | Maintained by Bluetooth SIG | <10 m | V1.2 - 1 Mbps<br>V2.0EDR - 3 Mbps<br>3.0 HS - 24 Mbps | Low power consumption, short range, Mobility not Expected | Initial pairing requires some manual intervention. Procedure can be long. Devices placed in "inquiry" and "inquiry scan" mode. | 1 MHz<br>3.0 HS requires a bandwidth of 22 MHz | Unlicensed bands:<br>2.4 GHz band |
| Wireless HD | Maintained by the Wireless HD consortium | <10 m | As high as 25 Gbps | High power allowed | Initial Channel scan by coordinator device Probe request/response mechanism for device discovery | 1.76 GHz | Unlicensed bands:<br>60 GHz band (large available spectrum - 7 GHz) |
| Cellular | 3GPP WCDMA & LTE | "Cellular" | R8 WCDMA - 42 Mbps DL & 11 Mbps UL<br>R8 LTE - 150 Mbps DL & 73 Mbps UL | Mobility permitted | — | WCDMA: 5 MHz each for UL and DL<br>LTE: 1.4-20 MHz each for UL and DL | Licensed bands e.g. Cellular, PCS (1900 MHz), IMT (2100 MHz), 700 MHz, . . . |
| Ethernet | | | Wired Technology (likely based on IEEE 802.3) | | | | | wireless video cameras, game controllers and fluorescent lights, to name a few. Each of the technologies in a home or office may be a closed network. There may be no coordination between the network technologies. They may rely on their own procedures for network formation, network discovery, service discovery, and interference management. This may result in inefficiencies.

A "wireless transmit/receive unit (WTRU)" may include any electronic device that is capable of transmitting and/or receiving data via one or more wireless interfaces. The term WTRU may include but is not limited to a user equipment (UE), a mobile station, a fixed or mobile subscriber unit, a pager, a cellular telephone, a personal digital assistant (PDA), a computer, or any other type of device capable of operating in a wireless environment. A "MTC WTRU" or a "M2M WTRU" is a WTRU capable of communicating using MTC/M2M technology. When referred to hereafter, the terminology "base station" may include but is not limited to a Node-B, a site controller, an access point (AP), or any other type of interfacing device capable of operating in a wireless environment. When referred to hereafter, the term "network node" may include a logical or physical entity that implements functionality in a core network or radio access network (RAN), such as but not limited to a base station, gateway, access server, or any other entity.

Various home/office network technologies may be referred to as capillary networks. Assistance may be provided to a capillary network, which may improve performance within the capillary network. A centralized gateway (CGW) is disclosed that may facilitate such assistance, e.g., via client devices in capillary networks. The CGW may be referred to as a converged gateway, centralized entity, central entity etc. A client device may be referred to as a client.

Figure 2:
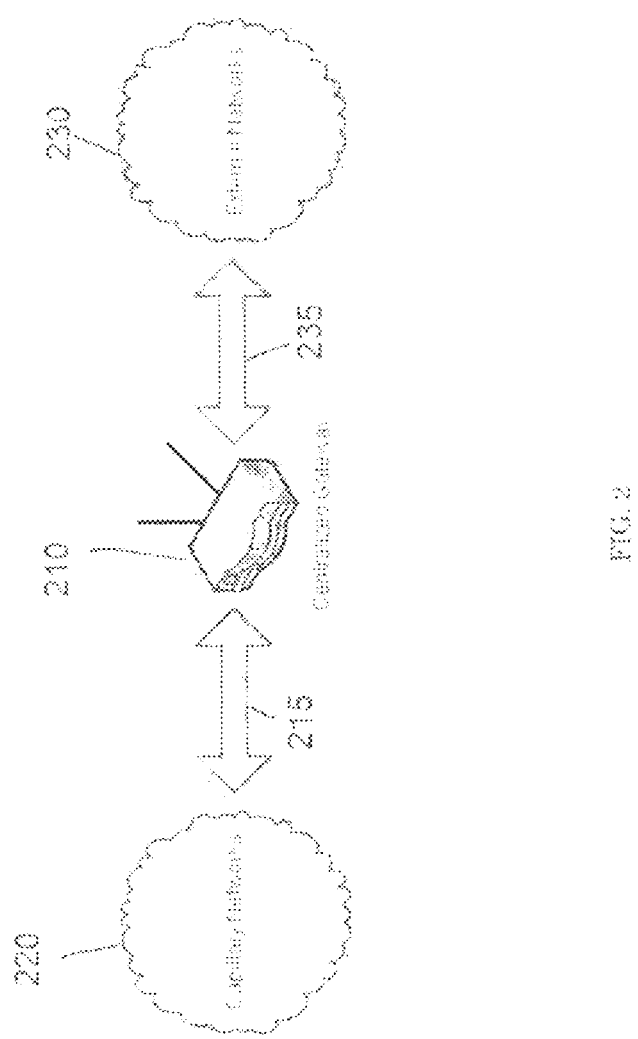
FIG. 2 illustrates an exemplary CGW in communication with capillary networks and external networks.

FIG. 2 illustrates an exemplary CGW 210, which may be in communication with capillary networks 220 and external networks 230. CGW 210 may provide access to external networks 230 (e.g., cellular, Internet, etc.). CGW 210 may communicate with capillary networks 220 over a common interface, such as the logical "A" interface 215 that provides signaling support for a set of control procedures that are managed by a "common logical A protocol." CGW 210 may collect information from capillary networks 220 and/or external networks 230 and fuse the information. CGW 210 may use the fused information in providing assistance to capillary networks 220 and their devices. The assistance may include, or may be referred to, as one or more of the following without limitation: assistance, assistant service(s), network control, coordination, routing, measurements, service, etc. The assistance may include controlling one capillary network to assist another capillary network.

At least one device in a capillary network may be capable of communicating over the logical A interface. A CGW may provide assistance to capillary networks through, for example: 1) coordination of spectrum usage (interference management); 2) node discovery assistance; 3) inter capillary network communication; 4) intra capillary network communication; 5) assisted service discovery (e.g., broadcast of ongoing sessions for peer gaming); 6) assisted load management; 7) set-up of opportunistic assistance through mobile devices; 8) assisted location mapping, etc.

Assistant services refer to services that may rely on fused and/or raw data stored in the centralized gateway (CGW) to assist and coordinate capillary networks. Assistant services may reside in both the CGW and in attached devices. Assistant services may rely on common logical A protocol procedures for communication between the CGW and attached devices.

A CGW may provide assistance and coordination among different capillary networks based on fused and raw information from the capillary networks and the external networks. The CGW may run a common logical A protocol and communicate with client devices within the capillary networks using a logical A interface. Furthermore, the CGW may run the assistant services that make use of the fused and raw data.

Capillary networks (CNs) may refer to networks managed either directly or indirectly by the CGW. Capillary networks may include ZigBee networks, WIFI networks, Bluetooth networks, direct links, infrastructure networks, etc. An attached device (AD) may refer to a device that has attached or made its presence known to the CGW. An AD may be synchronized with the CGW, and may receive transmitted control information. An AD may provide a capability indication to the CGW.

A physical location may refer to a location of a device in physical space (e.g., X, Y, Z coordinates, a room, etc.). A radio location may refer to a location of the device with respect to the ability to communicate, e.g., with the CGW. A coverage zone may refer to the cover of the CGW. The coverage zone may apply in an office environment, a commercial environment, etc.

Figure 3:
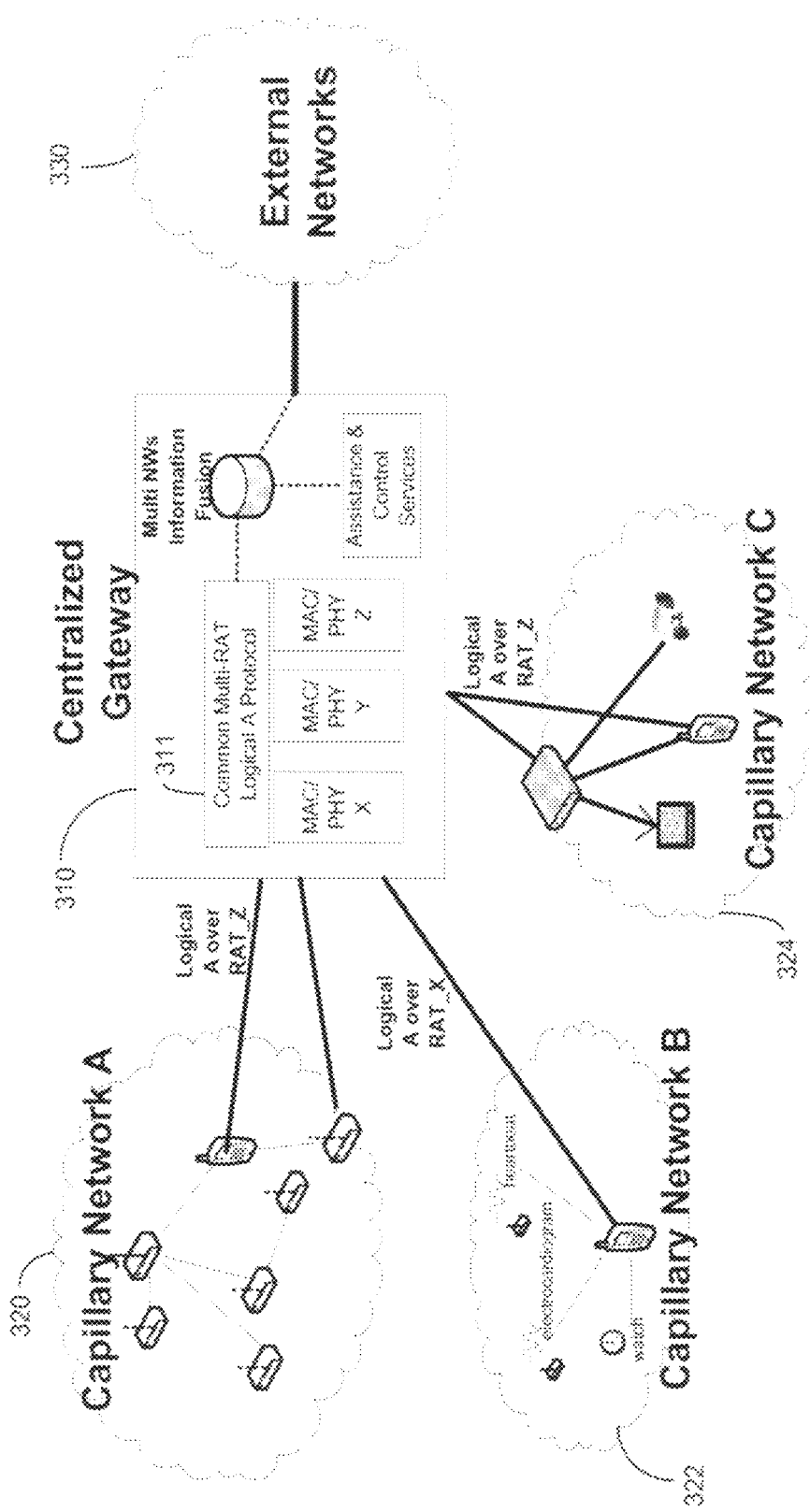
FIG. 3 illustrates an exemplary centralized gateway connected to a plurality of capillary networks and external networks.

FIG. 3 illustrates an exemplary centralized gateway, CGW 310, connected to a plurality of capillary networks (capillary network A 320, capillary network B 322 and capillary network C 324) and external networks 330. Information may be collected from the capillary networks and external networks 330 and fused in CGW 310. CGW 310 may use the fused information to 1) provide assistance services and network control to one of the capillary networks to which the central entity is connected (e.g., radio frequency (RF) measurements and characteristics, such as location information from capillary network A 320, may be collected and fused in the central entity to assist capillary network B 322); 2) control one of the capillary networks in assisting another capillary network (e.g., location and device capability of capillary network A 320 and capillary network B 322 may be collected and fused in the central entity where the CGW may control a device in capillary network A 320 to assist capillary network B 322), etc.

Information collection from the capillary networks, as well as signaling to carry control or assistance information to the plurality of capillary networks, may be enabled by a common logical interface, which may be referred to as the logical A interface or common logical A interface. This interface may link the common logical A protocol, which may reside in CGW 310 and the client devices in the capillary networks. In CGW 310, the common logical A protocol may be a common upper layer 311 to multiple radio access technologies (RATs) (X, Y, and Z) and may allow communication with a plurality of capillary networks. The logical A interface may require modification of the MAC and PHY layer of the RATs that support the logical A interface.

A CGW may provide assistance and coordination to capillary networks, as well as the capability for inter-capillary network routing. A CGW may provide communications to external networks (e.g., cellular, Internet, etc.) through, for example, a wireless cellular interface, a residential IP connection (e.g., through DSL, cable, FTTH), a satellite connection, etc. A CGW may be an evolved Wireless LAN access point, an evolved H(e)NB, a converged device which has both functionalities (and possibly other functionalities), etc. Mobile phones may behave as CGWs, e.g., where they have the multi RAT capability.

It may be necessary for each device in the capillary networks to communicate through a physical link with the CGW. Devices that do communicate with the CGW, may associate with the CGW and may be referred to as attached devices (ADs). Communication may be through the logical A interface, that may provide synchronization, control, a data plane functionality, etc. The control information may provide signaling between capillary network devices and the CGW to enable CGW managed assistance and coordination.

These functions may be achieved through dedicated channels, that may be a separate channel for each AD, or through shared channels, for instance using carrier sense multiple access/collision avoidance (CSMA/CA). Synchronization may provide the capillary network devices with reference timing, an indication of where to find the control information, etc. The control information may provide signaling between a capillary network device and the CGW, to enable CGW managed assistance and coordination.

The logical A interface may be implemented using an air interface, which may be optimized for the specific application and conditions (e.g., home, office, industrial, etc.). It may also be implemented by a logical A protocol, which may be a common layer sitting on top of multiple existing RATs. The logical A interface may be based on any other technology. For instance, if the CGW has H(e)NB functionality and WIFI, the logical A protocol may reside on top of the Uu interface (evolved H(e)NB interface) and a 802.11 interface.

ADs may possess at least one RAT that may be capable of communicating with the CGW. They may possess a common logical A protocol, which may sit on top of supported RATs, that manages logical A interface procedures. Client versions of assistant services may also be present in the ADs.

The CGW and the client device may use a common protocol, such as the logical A protocol, to collect and format information from capillary networks over multiple RATs. This may enable standard based collection across multiple RATs. For example, measurements collected over RAT X for a given client, using an existing standard based approach, may be transmitted over a format common to each RATs. The common logical A protocol may allow decisions based on fused data from multiple capillary networks to be sent to clients of a specific RAT and may enable new procedures for multi-RAT clients.

When a device wants to join the network and communicate with the CGW to take advantage of the services it offers and is capable of multiple RAT operation, the use of the common logical A protocol may enable the device to attach to the CGW and to inform it of its multi-RAT capability, and other capabilities, using any available RAT technology.

Figure 4:
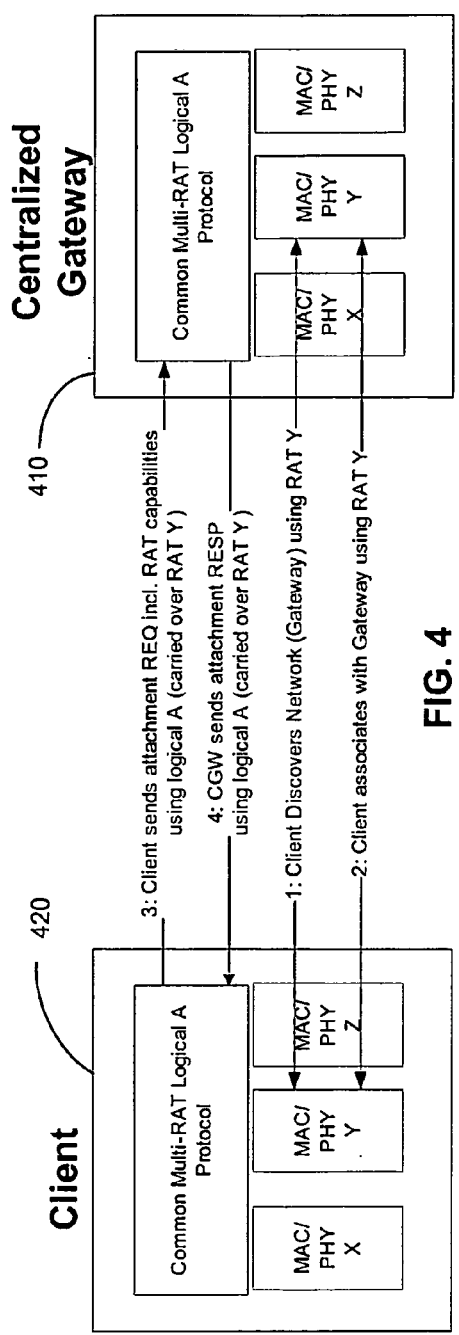
FIG. 4 illustrates an exemplary attachment procedure.

FIG. 4 illustrates an exemplary attachment procedure. At 1, client 420 may discover the network (CGW 410) by acquiring the synchronization and control information broadcast by the network using a given RAT technology (e.g., RAT Y). Client 420 may use any of the RAT technologies which it can support, in this case RAT X, RAT Y and RAT Z. At 2, client 420 may attach with CGW 410 using RAT Y. For example, client 420 may use RAT Y to attach with the network to get a network address, a MAC address, etc. At 3, client 420 may use the recently activated RAT Y to send an attachment request through the common logical A protocol. The attachment request may include the multi-RAT capabilities of client 420. This may enable CGW 410 to trigger the activation of another RAT at 4, or at some later time. The attachment procedure may include capability information that is pertinent for multi-RAT service assistance.

The attachment request may include one or more of the following: a) each RAT supported by client 420; b) for each RAT, what bands are supported; c) for each RAT, what other RAT it may support simultaneously (e.g., a GSM RAT may support Bluetooth but may not support WCDMA or LTE); d) for each RAT, whether the RAT is active or not; e) location tracking capability; or f) TVWS capability, whether the device is a Mode 1, Mode II, or Sensing only device. The attachment request may include information relating to services offered by client 420 (e.g., gaming, printing, storage and physical location, etc.).

At 4, CGW 410 may send an attachment response, which may indicate if the attachment request is accepted. This procedure may be complemented with authentication and security procedures. The attachment response may include a command to activate another RAT as an alternative or supplemental RAT based on the capability provided in the attachment request. This command may include the same information carried in a secondary RAT activation request.

The common logical A protocol at the CGW, such as CGW 410, may maintain a state machine for each client to maintain knowledge of which RAT, with its operating band, is active at a given time. The common logical A protocol at the client device, such as client 420, may maintain a state machine for the network in order to maintain knowledge of which RAT is active at a given time in its surroundings.

The logical A protocol in a CGW may broadcast the available RAT and associated bands supported by the network. This information may be signaled through any available RAT, e.g., in a periodic fashion. This may enable clients to activate another RAT autonomously without having to discover the other RATs available.

The activation of a secondary RAT of a given device already operating on a primary RAT may be initiated by the device itself or by the CGW. A device may initiate the activation triggered by a user decision or based on a device application decision (e.g., on a cell phone operating on a cellular network, a user enables a Bluetooth RAT to transfer files to a PC). The CGW may initiate and instruct network devices to activate a secondary RAT in a context of network assistance. For instance, the CGW may instruct a device to enable a secondary RAT to perform sensing in order to assist another network operating primarily on the secondary RAT. The CGW may instruct two devices to enable a secondary RAT in order to setup a direct link between these two devices on that RAT (e.g., the CGW coordinates 802.11n/TVWS direct link setup between a TV and a Setup-Box attached primarily to the CGW on a 802.11/ISM band).

Whether it is a device or a CGW initiated activation, the common logical A protocol may define procedures to support the secondary RAT activation. These procedures may include a device sending a secondary RAT activation indication signal to the CGW which may include one or more of the following: 1) a nature of the indication (e.g., the device informing the CGW of the device's decision, the device requesting assistance from the CGW to provide a designation of the RAT and/or the RAT configuration, etc.); 2) a RAT to Activate; or 3) a RAT configuration which may include the used band, channel information, power setting, antenna setting, etc. If the nature of the indication is to request assistance, the CGW may send back a secondary RAT activation response with the requested information. A secondary RAT deactivation indication and response may be transmitted at the termination of the RAT operation.

The common logical A protocol may define a procedure to support the secondary RAT activation which may include the CGW sending a secondary RAT activation request signal to a device, or a set of devices. Before sending this request, the common logical A protocol at the COW may verify capabilities of the devices and whether the RAT is already active or not, e.g., by using the state machine for each device. The request may include one or more of the following: 1) an activation cause, such as sensing, direct link setup, location tracking; 2) a RAT to activate; 3) a RAT configuration which may include the used band, channel information, power setting, antenna setting (e.g., when activating a Bluetooth RAT, the device may be told the channel hopping sequence.) This feature may be used to speed up capillary network discovery; 4) a time to activate; 5) a device role (e.g., the CGW may request a device to play a role of an AP or a client when enabling a WI-FI RAT); 6) peer devices identification which may be applicable when direct link setup or device location tracking is used; or 7) in case of an activation for sensing, the CGW may provide measurement configuration information (e.g., which events to monitor, when to send back measurement reports (periodic or triggered), etc.).

The devices may accept or may reject the activation request and may send a secondary RAT activation confirmation. When the request is rejected, a reason may be included. A secondary RAT deactivation request and confirmation may be required to terminate the RAT operation. The common logical A protocol at the CGW may dynamically maintain the state machine for each client on the activation or deactivation of a RAT.

Figure 5:
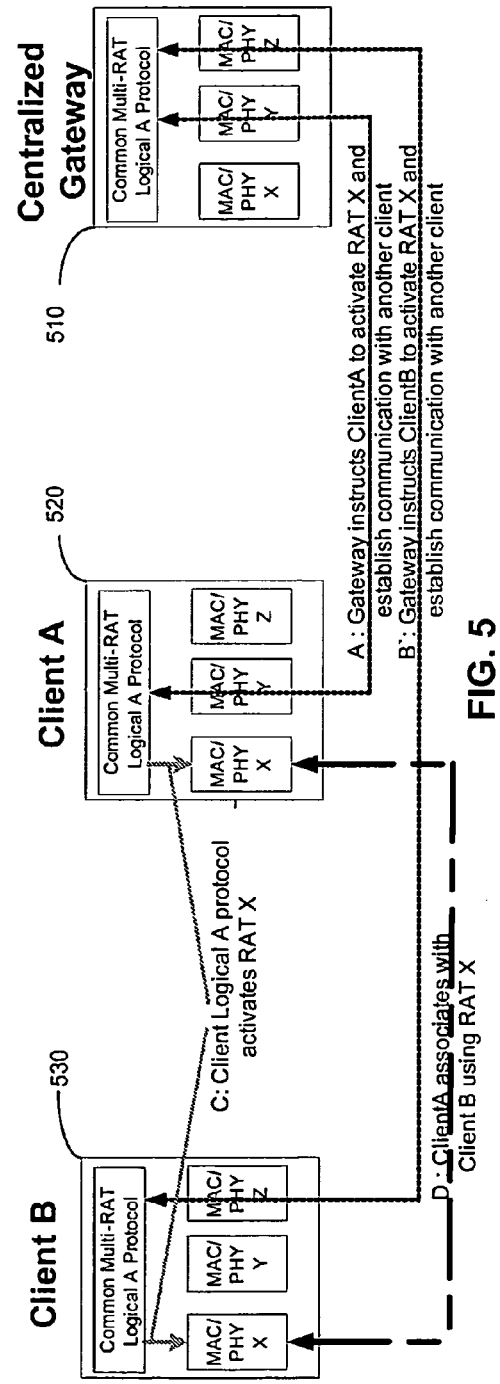
FIG. 5 illustrates an exemplary coordination of a direct link setup.

FIG. 5 illustrates an exemplary coordination of a direct link setup between two client devices. In FIG. 5, CGW 510 may coordinate the setup of a direct link on a secondary RAT X between two devices, client A 520 and client B 530, that are already attached to CGW 510 through different primary RATs, RAT Y and RAT Z, respectively.

At A, CGW 510 may instruct client A 520 to activate RAT X and establish communication with client 530. At B, CGW 510 may instruct client B 530 to activate RAT X and establish communication with client A 520. At C, client A 520 and client B 530 may activate RAT X. At D, client A 520 may associate with client B 530 using RAT X.

A number of procedures may be enabled by the common logical A protocol that may result in a change of the operating mode of an entire capillary network or of a specific capillary network device. The term "operating mode" may refer to one or more of: 1) frequency band of operation; 2) frequency channel of operation; 3) transmission related parameters which may include modulation, coding, power, and directivity; 4) capillary network media access configuration parameters; or 5) device client role (e.g., router, end device, coordinator, etc.) where, for example, a WIFI station may be asked to act as a access point for load balancing or range extension. The operating mode may be changed based on the fused data available at CGW 510 and assistant services logic. The decision is sent to target attached devices, which are then responsible for initiating the operating mode change.

Figure 6:
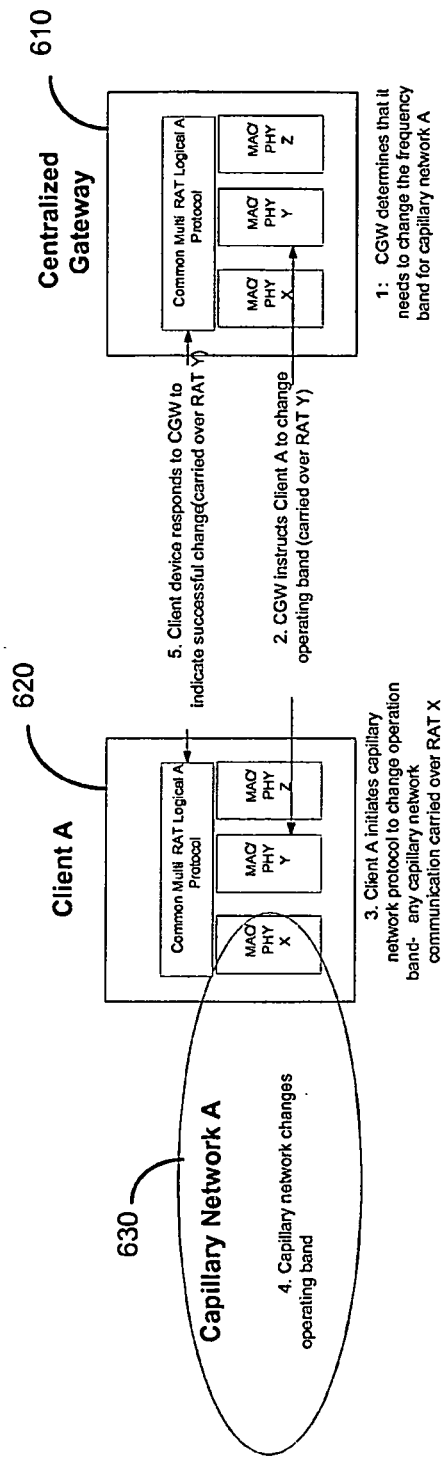
FIG. 6 illustrates an exemplary frequency band change.

In FIG. 6, an exemplary frequency band change is depicted. This is a procedure whereby the CGW may use fused data to determine that a capillary network may change the operating frequency band. It may be understood that a similar mechanism may be used for the other procedures, which may include using different signaling.

Referring to FIG. 6, at 1, CGW 610 determines that it may need to change the frequency band for capillary network A 630 based on fused data information. A decision algorithm may rely on fused information related to one or more of device location, capillary network load, interference levels or spectrum availability (e.g., whitespace). For example, an assistance service in CGW 610 may determine that the interference level on the current operating frequency is high, and that a change of band may be needed to maintain a suitable quality of service for capillary network A 630. In another example, an assistant service in CGW 610 may determine that the current band is experiencing congestion and may request a band change for load balancing reasons.

At 2, CGW 610 may send a control message to an attached client device (Client A 620) within capillary network A 630, requesting a change of operating band. The message may include one or more of the following: 1) new operating band and frequency; 2) device transmission related parameters (e.g., modulation, coding, Tx power, etc.); 3) time-related parameters (e.g., when the change is to take effect, if this is a synchronous change, maximum time to complete change, etc.); 4) result of a failure case (e.g., what to do if the capillary network is not capable of performing the band change, for instance, the capillary network may be directed to stop operation or to continue on the current band using different transmission parameters); or 5) type of result to return for a success.

At 3, client A 620 may initiate a capillary network protocol over RAT X to effect the change of the operating band. For example, if the capillary network is a 802.15.4 ZigBee WPAN network, the attached device, client A 620, may communicate with the WPAN Network Manager to request a change of channel. If the operation is successful, at 4, capillary network A 630 may change the operating band. At 5, client A 620 may respond with an indication of a successful operating mode change. Otherwise, the client A may respond with an indication of a failed operating mode change.

The logical A protocol may include one or more of the procedures described in Table 2. Secondary RAT activation and operating mode change may use one or more of the procedures described in Table 2.

TABLE 2

| | |
|---|---|
| A interface Initialization | Procedure to initialize the A interface channel, which may potentially include a synchronization channel, a control-plane channel, and a user-plane channel This initialization details the mechanism to transport the A interface synchronization, control, and user-plane data, over the underlying RAT technologies. |
| A interface Reconfiguration | Procedure to allow CGW to reconfigure the A interface (for instance changing the mapping of the synchronization, control, and user-plane data from RAT X to RAT Y). |
| A interface Failure | Procedure to recover from an A-interface failure, as measured at the Logical A protocol. Upon detection of an A-interface failure, the Attached Devices can to continue communicating within their capillary networks. Failure can be determined by monitoring a combination of the signal quality of a synchronization channel and the received cyclic redundancy Check (CRC) failures over an observation window, and declaring a failure if the quality of the signal or number of CRC errors passes a threshold [8][9]. |

TABLE 2-continued

| | |
|---|---|
| Routing | Set of procedures that allow use of the A-interface link to route traffic between two Attached devices within a capillary network or across two capillary networks. In one embodiment the Common Logical A protocols in the two Attached Devices would set up routing entries in the capillary network devices so that data would be siphoned out over the A interface and then siphoned back into the capillary network. At the CGW, the Common Logical A protocol would set up the transparent link between the two attached devices. This would be especially useful in capillary networks that form tree topologies which have a large depth (e.g ZigBee networks). When devices at opposite ends of this tree need to communicate, the large depth translates into multi-hop transmission and significant routing delays. The CGW can act as a relay, linking outlying devices of a capillary network and reducing the number of transmission hops. In a second embodiment, the routing procedures are used to allow recovery from a direct link failure. The A interface is used as a temporary bridge between the direct link devices until a new link is established. |
| Device Paging | Procedure used by a CGW to wake up a "sleeping" device that is not continuously monitoring the A interface. In one embodiment, the CGW sends a paging request for Client A through a Client B. CGW sends the paging request to Client B (an Attached Device not in sleep mode), which then forwards the paging request, through the capillary network, to Client A. |
| Device Neighbour Discovery | Procedure to establish a location map of attached devices (allows CGW to determine which devices are in communication range). In one embodiment, the procedure is initiated by the CGW, which tells the Common Logical A protocol in the Attached Devices to send out probe signals within the capillary network. The probe responses are used to build a neighbour map for each of the Attached Devices. This Neighbour map can be forwarded to the CGW to be used by a fusion algorithm. |
| Management of Broadcast information | Procedure used by CGW to broadcast information to Attached Devices (or devices wanting to Attach). The content of the broadcast information can be provided by one or more Assistant Services based on fused data (for example the service data described in Section Error! Reference source not found.) |
| Proxy Device Attachment | Procedure used by an Attached Device to inform the CGW of a legacy device that cannot communicate over the A interface. The Common Logical A Protocol in the Attached Device can provide information that would be contained in the normal Attachment procedure, For example, RAT capability, service capability, device location, etc |
| Capillary Network Translation | Procedure whereby a CGW performs translation to allow inter-capillary network communication. |

Figure 7:
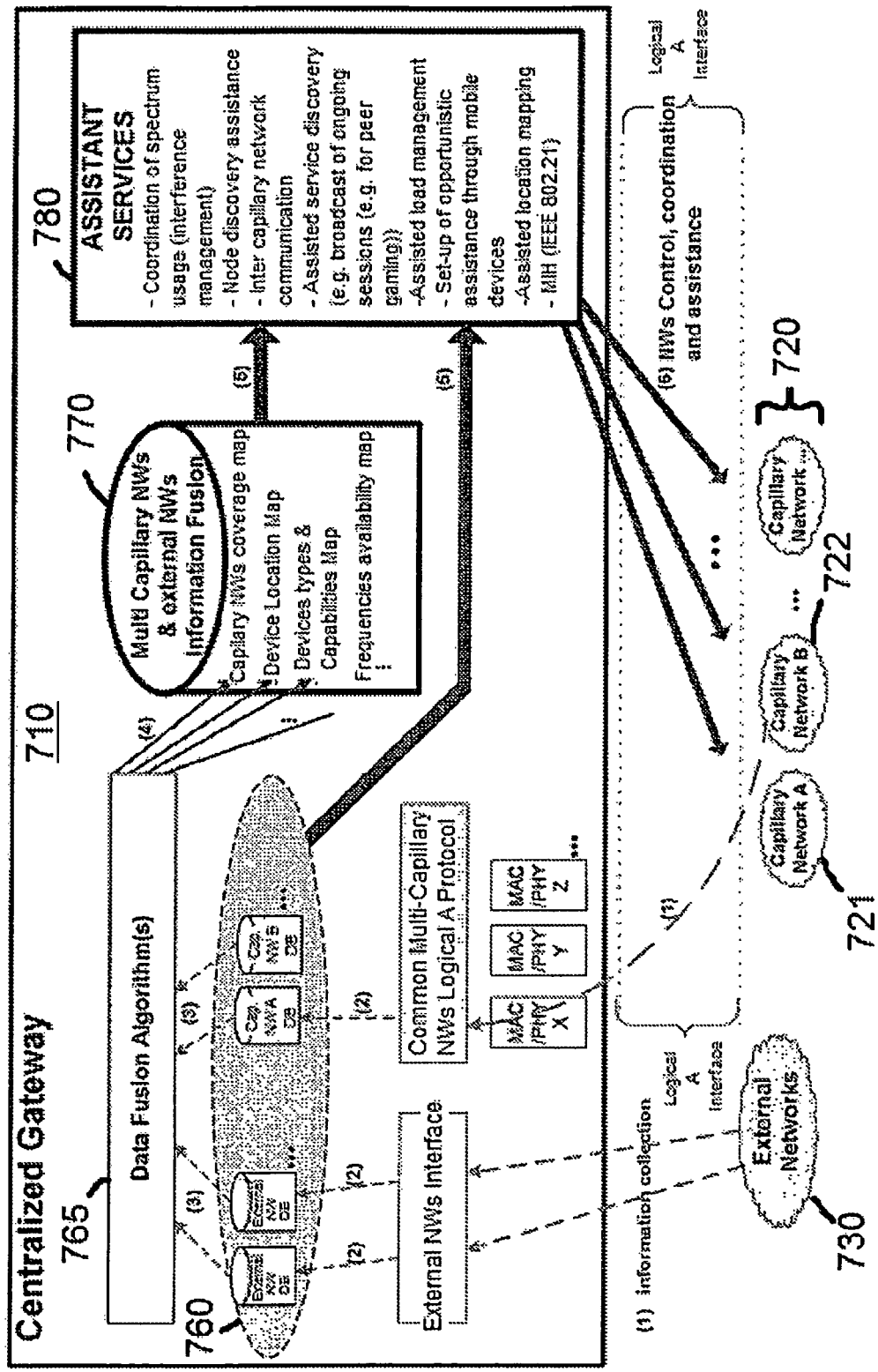
FIG. 7 illustrates an exemplary system operation diagram.

FIG. 7 illustrates an exemplary system operation diagram. CGW 710 may collect, through the logical A-interface, information (e.g., RF measurements, network operation measurements, traffic rate, load, devices location, devices capabilities, etc.) from the capillary networks 720 as well as from the external networks 730. This information may be collected during device attachment to the CGW. This information may be collected during ongoing device operation, for instance upon a change or periodically. For CGW 710 to collect information, CGW 710 may control and configure devices of capillary networks 720 to report the information. CGW 710 may create specific databases 760 per network (e.g., capillary network and external network) from the collected information. CGW 710 may execute a set of data fusion algorithms 765. A data fusion algorithm may fuse information collected from capillary networks 720 and/or external networks 730. CGW 710 may be dynamically updated and configured with information fusion algorithms. Exemplary information fusion database 770 may include, but is not limited to, one or more of device location map, services/capability repository, capillary networks coverage map, or frequencies availability map.

CGW 710 may collect and fuse device location information into a devices location map, e.g., from one or more capillary networks. The fused information may be a map of multi-network attached device locations, which may be a physical location or a radio location. The fused information may be used by CGW 710 to provide one or more of assistant services, such as assistant services 780, which may include any of the assistance disclosed herein. For example, assistant services 780 may include one or more of: emergency location services within the home or office, device maintenance (e.g., to know the location of a mobile device that has malfunctioned), coordination of spectrum usage, node discovery assistance, inter-capillary network communication, assisted service discovery, assisted load management, set-up of opportunistic assistance through mobile devices, assisted location mapping, etc. This fused data may assist with spectrum management. CGW 710 may base spectrum management decisions on the density of attached devices, thereby avoiding assigning spectrum which may be heavily used in certain locations.

CGW 710 may collect from capillary networks 720 capability information and service information of devices and it may fuse this into a creating a Services/Capability Repository. The capability information may include radio access capabilities (e.g., supported technologies, radio bands, receive and transmit bit rates, transmit power limits, etc.) as well as information dealing with other physical attributes such as power source (e.g., battery and mains), available power (e.g., for battery operated devices), storage capability, available storage, etc. The service information may include an indication of the ongoing services or potential services that may be offered by the devices in the capillary networks. The use of a proxy device attachment procedure may allow CGW 710 to keep track of service/capability information for devices that do not directly communicate with CGW 710 (e.g., they have no A interface). The proxy devices may relay the service/capability information to CGW 710. This information may be fused with other types of fused information including the devices location map.

The fused information may be stored in the information fusion database 770. Information fusion database 770 may be dynamically and periodically updated, e.g., by data fusion algorithms 765 execution. New types of information fusion may be added in the information fusion database.

CGW 710 may enclose a set of assistant services 780 to control, coordinate and assist capillary networks 720. Assistant services 780 may make use of fused information as well as the collected raw information specific to the individual networks, such as the information available at specific databases 760. A variety of assistant services may be defined. CGW 710 may be dynamically updated and configured with new assistant services. CGW 710 may control and assist by controlling directly one capillary network. CGW 710 may control one of the capillary networks in assisting and controlling another capillary network.

The system architecture enables a variety of assistant services 780. Each assistant service may make use of the information fusion database 770 and individual capillary networks databases in order to assist directly a capillary network and/or to control one of the capillary networks in assisting another capillary network. CGW 710 may request capillary network A 721, or specific devices belonging to capillary network A 721, to sense the operating channel with a specific sensing algorithm applicable to capillary network B 722, in order to assist capillary network B 722. In a context of low power low complexity devices like ZigBee/802.15.4 capillary networks, devices may spend most of their time in a sleep mode to save power and may have limited sensing capability. These types of networks may not perform active RF-measurements. They may be subject to dynamic interference. In that context, a co-located capillary network like the WI-Fi Network, capillary network A 721, may take sensing measurements to assist a ZigBee network.

CGW 710 may collect device location information and operating characteristics of a ZigBee network as well as a WIFI Network, which may include the operating channel of the ZigBee network. CGW 710 may then instruct Wi-Fi devices to perform periodic RF-measurements on the ZigBee's operating channel with a specific sensing algorithm applicable to ZigBee networks. These RF-Measurements may be collected periodically at CGW 710. CGW 710 may periodically fuse the RF-Measurements per WIFI device with the WIFI devices location map as well as the ZigBee devices location map in order to detect high interference occurring on the ZigBee channel. Consideration of RF-measurements may be limited to WIFI devices collocated with the ZigBee devices. Once the interference is detected, CGW 710 may inform the ZigBee network and/or control the ZigBee network by instructing the ZigBee ADs, devices attached to CGW 710 through the logical A interface, to initiate a network channel switch.

CGW 710 may instruct the WIFI devices to monitor a valid alternate channel for the ZigBee network. Once high interference is detected, CGW 710 may control the ZigBee network to switch channels to the validated alternate channel. Service discontinuity that may occur as a result of the interference, may be reduced at the ZigBee network.

CGW 710 may setup and control a proxy device with multi-RAT capability by providing opportunistic network healing assistance to a given capillary network. As CGW 710 communicates with ADs from multiple technologies, it may ask the devices to help in the operation of one or more capillary networks. The assistance may be opportunistic in that there may be no guarantee that any AD is in range of the target capillary network. The final decision of whether to assist may be left to the AD. For instance, an AD may decide to refrain from providing opportunistic assistance to conserve battery power.

Still referring to FIG. 7, at 1, CGW 710 may collect information about capillary networks 720 and external networks 730, e.g., in terms of their connectivity, their location, their RAT capabilities, etc. Information is gathered and fused as illustrated at 2, 3 and 4. CGW 710 may run an application at 5 to determine a needed assistant services 780, e.g., detect or confirm that a device in a given capillary network (e.g., capillary network A 721) is not connected to the capillary network, which may be referred to as a singleton device or node. The singleton detection application may also be triggered by some of the devices in the capillary network informing CGW 710. At 6, CGW 710 may provide assistance to capillary networks 720.

A network healing assistance application may be triggered by CGW 710. Using information fusion database 770, CGW 710 may identify a device with multi-RAT capability (e.g., a device with RAT capability Y assuming capillary network A 721 uses RAT Y) in the vicinity of the projected location of the singleton node. This device may be referred to as a proxy healing device. Since this device may not have the RAT used by capillary network A active, CGW 710 may inform the proxy healing device of its needs, possibly using the device's current active RAT (e.g., RAT X). This may trigger the activation of RAT Y, which is used by the singleton node. The proxy healing device may communicate with the singleton node or possibly neighbor nodes to reconnect the singleton node with its neighbors. For example, capillary network A 721 may be based on Bluetooth technology (e.g., Bluetooth may equate to RAT Y). In a scatternet, Bluetooth nodes may be master or slave nodes. A master node may not connect with another master node, therefore creating a bottleneck in the capillary network. The proxy healing device may interact with these nodes and force them to change their role thus repairing the node permanently.

A proxy healing device may broadcast information to speed up network formation and network joining by communicating to legacy ZigBee networks that cannot attach to CGW 710. In such a case, the mobile acts as a relay for control messages to/from the capillary network.

Network healing assistance may be provided by gathering information about a capillary network and signaling this information to CGW 710. The information may be "filtered" at the healing device and indications sent to CGW 710 based on the filtered data and on certain thresholds. The AD and the capillary network need not be limited to the cases described.

As an example, the attached device may be a smartphone that has attached with the CGW and provided, in its capability information, an indication that it supports ZigBee. The CGW may then request that the attached device provide assistance to the ZigBee network. This assistance may include one or more of: 1) extending the reach of the CGW by transmitting syncicontrol channel information as a proxy for the CGW; 2) connecting to the ZigBee capillary network and acting as a temporary router within the capillary network, or a gateway to the CGW.

Proxy tracking services may be provided. One or more devices currently inactive in capillary network A 721 may be used to track the location of a device with an unknown location or with no location tracking capability belonging to capillary network A 721. A request to track a device with unknown location may be handled by CGW 710 by first identifying one or more devices with known location or tracking location capability and with RAT capability compatible with the device with the unknown location. The identified devices may activate the compatible RAT and may start scanning around to actively or passively detect the presence of the device with the unknown location. If a device finds the device with the unknown location, it may inform CGW 710 and provide additional observation characteristics such as signal strength. For example, there may be a request to find a Bluetooth enabled camera smartphones spread around the house or other consumer electronics devices with a known location may be requested to activate Bluetooth radio and scan for the camera using Bluetooth technology.

Capillary networks services discovery assistance may be provided. Using fused information, including information relating to available/ongoing services on a plurality of RATs of the capillary networks, CGW 710 may assist a device (or devices) from a capillary network to enable a specific RAT and use a service. This may be useful in order to share peer-to-peer applications (e.g., gaming). For example, upon entering a home or after turning on a smartphone, the device may attach to CGW 710 through the common logical A interface (e.g., WIFI). Upon attaching, the smartphone may inform CGW 710 about its service preferences and its capabilities. CGW 710 may fuse and use the service/capabilities repository with the devices location map in the information fusion database 770 and issue a directed response to the smartphone with service offerings in its vicinity, based on the device's preferences/capabilities. The smartphone may be made aware of the service offerings through broadcast information by CGW 710. After a user selects an ongoing service, like a game, CGW 710 may assist the smartphone with the location where the game is taking place and provide a direction and/or a distance. CGW 710 may provide a location map on the physical home layout. While the user is moving to the location (e.g., a room in the house) where the game is taking place on a Bluetooth network, CGW 710 may assist the smartphone in enabling its Bluetooth RAT, which by default may be disabled, and configure it with the channels to use and the channel hopping sequence. Therefore, the smartphone may have a fast association to the Bluetooth network which may offer a fast game start experience to the user.

A capillary network optimization assistance service may be a service whereby a CGW may use its fused and raw data to help optimize the performance of a capillary network (e.g., by maximizing throughput, minimizing delay, etc.). For example, many capillary networks may use a form of carrier sensing as part of the medium access protocol (e.g., CSMA/CA). If a centralized entity, such as a CGW, is present, it may be used to assist in the Media Access Control (MAC) algorithm in a number of ways, which may include one or more of: 1) providing a frame/slot structure to allow slotted CSMA; 2) broadcasting a jamming signal to signal to an attached device that a collision has occurred, which may eliminate the need for request-to-send and clear-to-send (RTS/CTS) transmissions; 3) signaling/broadcasting dynamic MAC parameters (e.g., in 802.11, this may include the inter-frame spacing parameters, the random backoff parameters after sensing a busy channel) where the CGW may use its knowledge of the AD location and service profile to tailor parameters in order to maximize throughput or minimize interference; or 4) augmenting the basic CSMA/CA algorithm by reserving a portion of the spectrum resources to a demand assigned based access control where the CGW may manage capacity requests from ADs, and assign capacity based on any number of metrics, including but not limited to fairness and traffic priority.

In addition, an assistant service may provide load management within capillary networks. For example, a CGW may decide to rearrange a capillary network. The CGW may decide to split a capillary network into two, or more, smaller capillary networks and provide inter-capillary network communication between such networks. The throughput on each of the split networks may then be independently maximized. This may require that the CGW be made aware of the load in a capillary network (e.g., routing congestion, delay statistics, throughput statistics, etc.). The CGW may instruct specific devices to change their parent router to another more lightly loaded router.

An interference management assistance service may use fused information relating to measured interference, device location, and device capability to request devices to use directed antennas, thereby pointing energy to the desired recipient and away from other devices that may be sharing the same band. The assistant service may provide the necessary information to the devices (e.g., location, transmit power, etc.) through broadcast information carried over the common logical A interface. The common logical A protocol in these devices may interpret the broadcast information and autonomously determine the direction of transmission.

The interference management assistant service may provide for time sharing of a frequency channel. The CGW may coordinate a time sharing of a frequency channel across K capillary networks. The CGW may provide a usage schedule for the K capillary networks, and the common logical A protocol in the attached devices may control capillary network transmissions based on this schedule.

The interference management assistant service may assist in spectrum/interference management. The interference management assistant service may talk to a centralized spectrum manager entity (reachable through the cellular network and/or Internet) that may reserve or assign a spectrum across multiple bands for intra-home use that is of "high quality" (e.g., low interference). The spectrum manager may allocate a spectrum dynamically based on requests from the CGW. It may make the allocation and re-allocation decisions based on other metrics, received measurement information from other CGWs, white space use, etc.

Once a spectrum is assigned to the CGW, the CGW may be responsible for managing the spectrum within the home. For instance, it may choose to assign frequency channels to individual capillary networks based on received requests. The size and frequency band of the assignment may be a function of the traffic to be carried on the capillary network.

The CGW may use device location information and/or the physical layout of the coverage zone to request devices to use directed antennas, thereby, pointing energy to the desired recipient and away from other devices that may be sharing the same band. The CGW may provide the necessary information to the devices (e.g., location, transmit power, etc.) and have the devices autonomously determine the direction of transmission.

The CGW may also control interference by limiting the transmit power of the devices in the capillary networks. The CGW may set the initial transmit power of ADs based on an open loop technique, and then change this limit dynamically as interference conditions change. The CGW may limit the minimum transmit power of an AD, for instance, to guarantee coverage within the capillary network.

A session transfer assistance service may use fused data to enable a CGW to control a session transfer between devices. For instance, a video session may be transferred from a smartphone to a HDTV. The session transfer assistance service may make use of the location map, capability map, and fused load/interference information to select the device to which to transfer a session (e.g., target device). The CGW may be responsible for paging the target device, setting up the intra-home path from the broadband modem (or other such device that receives the content) and the target device, reformatting the data to meet the service display requirements of the target device and tearing down the link to the smartphone.

Figure 8:
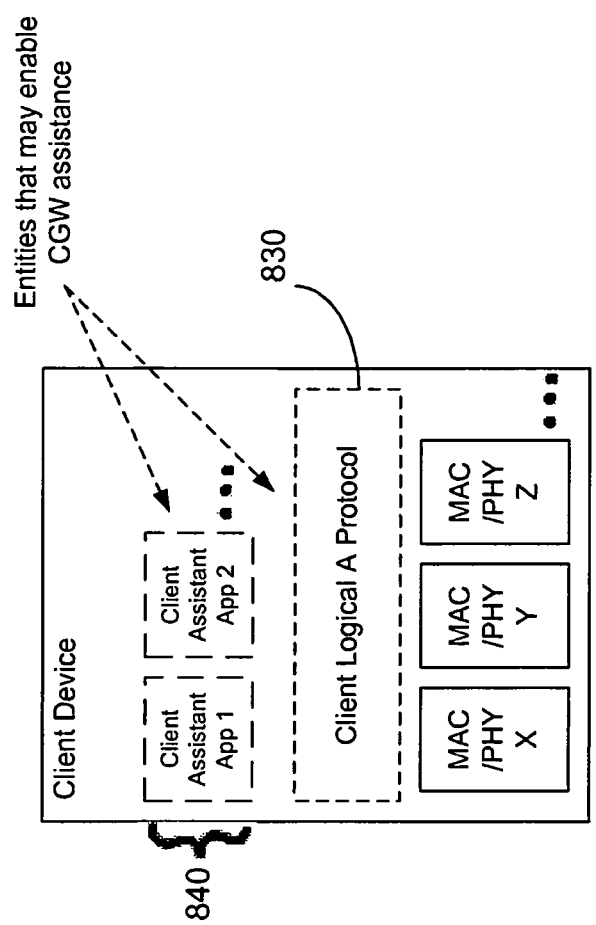
FIG. 8 illustrates an exemplary client protocol stack.

FIG. 8 illustrates an example client protocol stack in a client device 820. In order to support CGW network assistance concepts, client devices may require two types of entities. First, a client logical A protocol 830 may be needed to implement different procedures of the logical A interface, which may include one or more of a) device attachment to the CGW and providing services/capabilities of devices which may allow filling-up the services/capabilities repository in the information fusion database; b) measurement configuration and reporting; c) RAT activation/deactivation, where, for example, the CGW may activate the Bluetooth RAT of the smartphone to join an ongoing game in a Bluetooth network; or d) channel configuration/reconfiguration as may be used in the inter-capillary network sensing assistance service to switch a channel of a network experiencing high interference or as may be used in the capillary networks services discovery assistance service where the activated Bluetooth RAT is configured with the channels information. Second, one or more client assistant applications 840 may interact with CGW services in order to enable CGW assistance. Client device 820 may be dynamically updated and configured with new client assistant applications 840. An example of a client assistant application is illustrated in the capillary networks services discovery assistance service. When a CGW informs a device of available games, the user may select a game through a client assistant application with a user interface. The client assistant application with a user interface may display to the user the location map of the location where the game is taking place.

Figure 9:
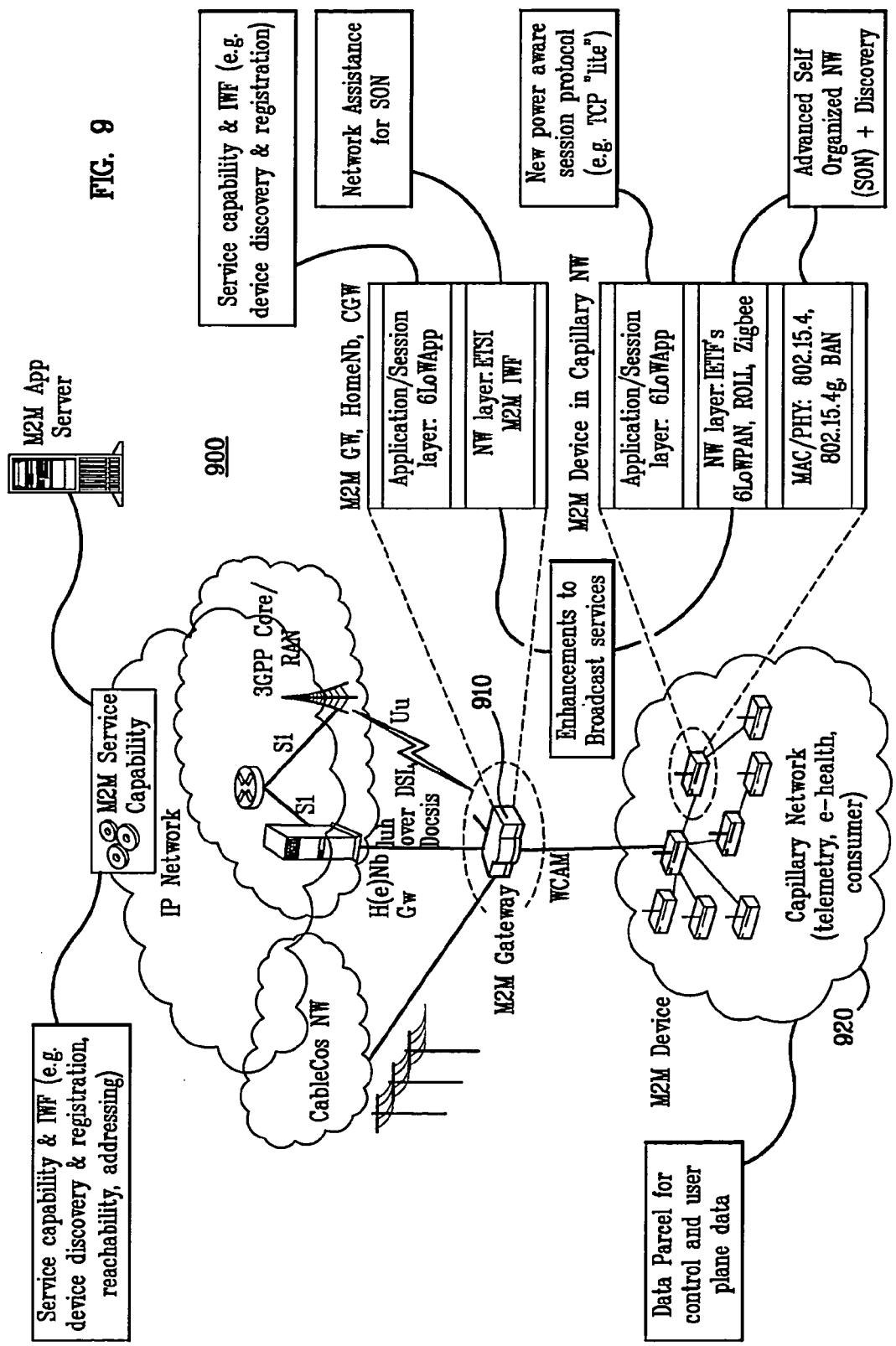
FIG. 9 illustrates an exemplary mapping of network assistance.

FIG. 9 shows an exemplary mapping 900 of the assistance/coordination functions and procedures described herein, within a machine-to-machine (M2M) type capillary network 920. CGW 910 may perform centralized gateway functions as described herein.

Figure 10:
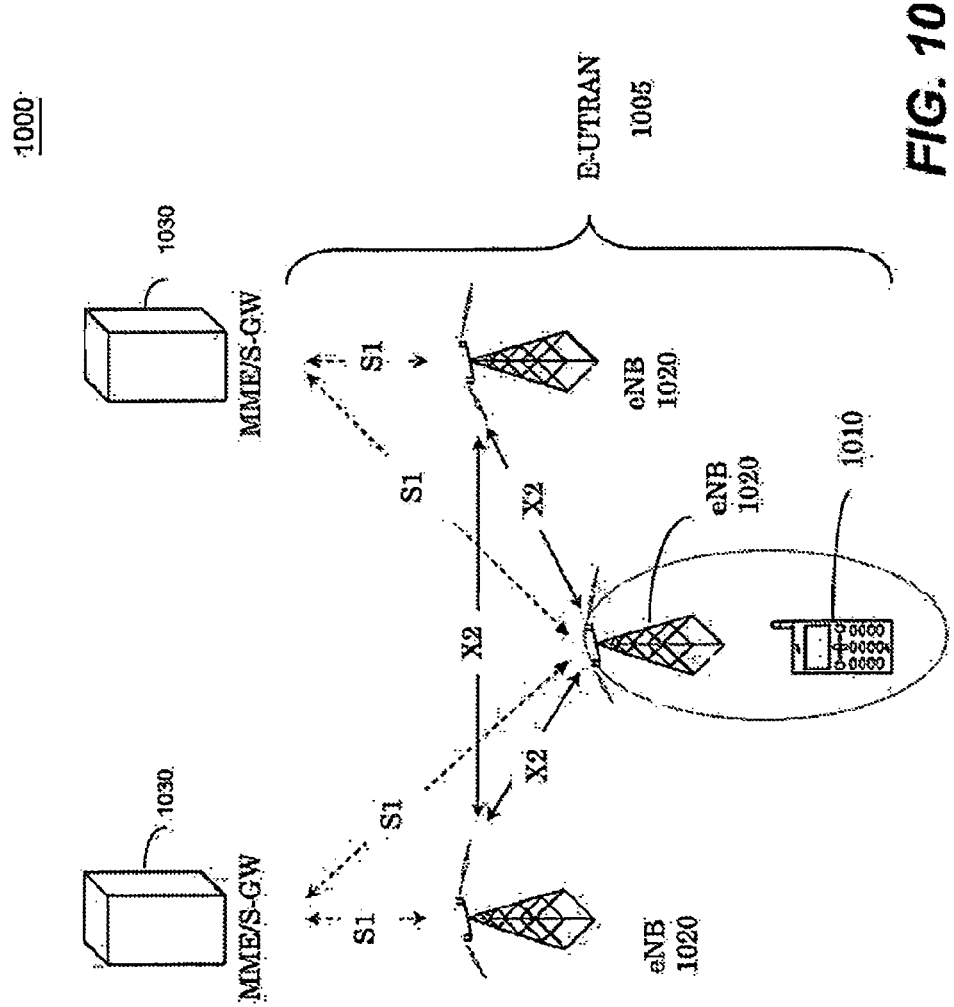
FIG. 10 illustrates an exemplary wireless communication system.

FIG. 10 shows an example wireless communication system 1000, which may be configurable to perform the methods and features described above with reference to FIGS. 1-9. The wireless communication system 1000 includes an Evolved-Universal Terrestrial Radio Access Network (E-UTRAN) 1005. The E-UTRAN 1005 may be connected to a System Architecture Evolution (SAE) core network (not depicted). The E-UTRAN 1005 includes a WTRU 1010 and several evolved Node-Bs, (eNBs) 1020, which may be H(e)NBs and/or macro NodeBs. The WTRU 1010 is in communication with an eNB 1020. The eNBs 1020 interface with each other using an X2 interface. Each of the eNBs 1020 interface with a Mobility Management Entity (MME)/Serving GateWay (S-GW) 1030 through an S1 interface. Although a single WTRU 1010 and three eNBs 1020 are shown in FIG. 10, it should be apparent that any combination of wireless and wired devices may be included in the wireless communication system 1000.

Figure 11:
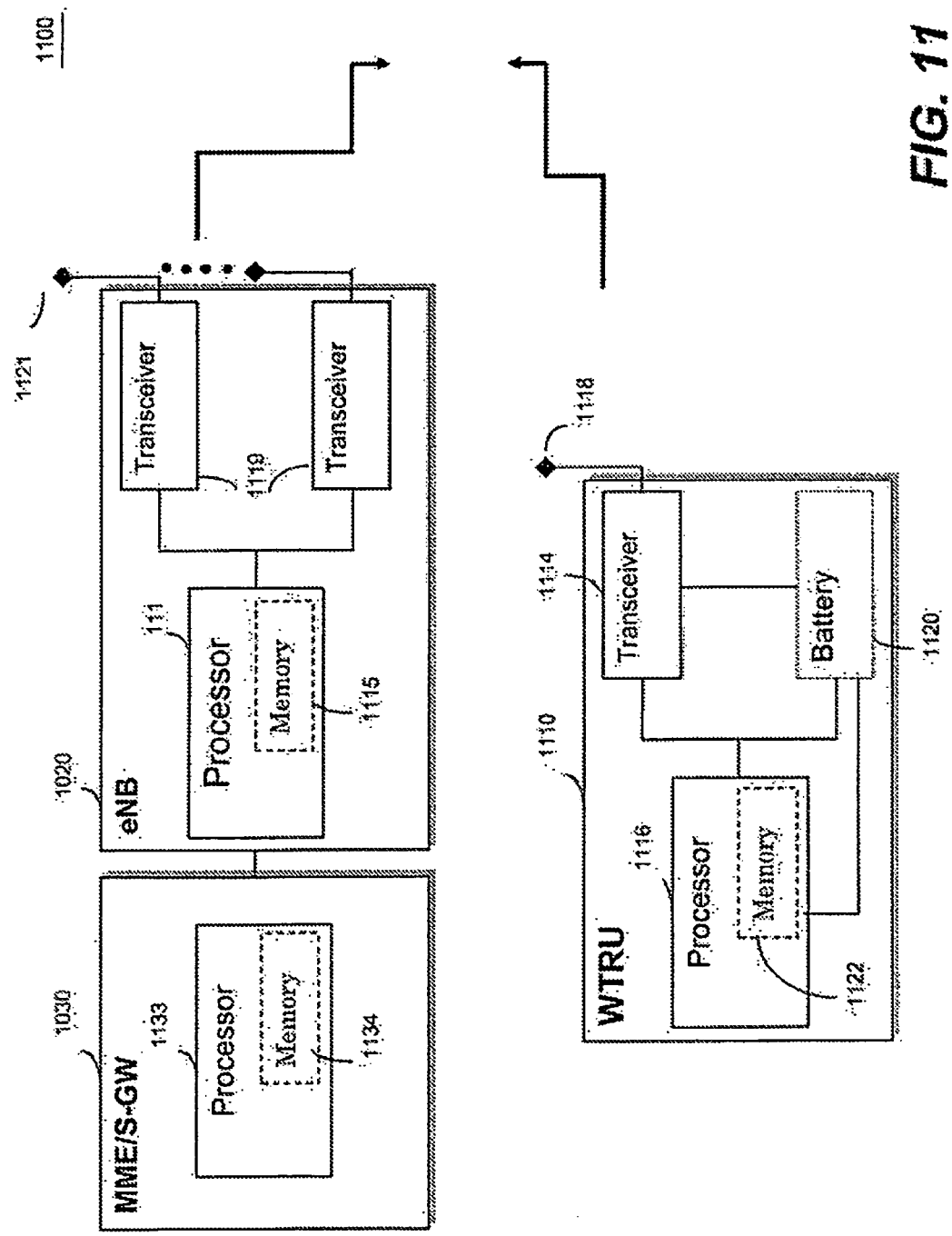
FIG. 11 provides a further detailed view of the exemplary wireless communication system of FIG. 10.

FIG. 11 is an example block diagram of an LTE wireless communication system 1100 including the WTRU 1110, the eNB 1020, and the MME/S-GW 1030. As shown in FIG. 11, the WTRU 1110, the eNB 1020 and the MME/S-GW 1030 which may be configured to perform the methods and features described above with reference to FIGS. 1-9.

In addition to the components that may be found in a typical WTRU, the WTRU 1110 includes a processor 1116 with an optional linked memory 1122, at least one transceiver 1114, an optional battery 1120, and an antenna 1118. The processor 1116 may configured to generate, encode, decode, and process messages as described above with reference to FIGS. 1-9. The transceiver 1114 is in communication with the processor 1116 and the antenna 1118 to facilitate the transmission and reception of wireless communications. The transceiver 1114 may be configured to generate, transmit, and receive messages such as those described above with reference to FIGS. 1-9. In case a battery 1120 is used in the WTRU 1110, it may power the transceiver 1114 and the processor 1116.

In addition to the components that may be found in a typical eNB, the eNB 1020 includes a processor 1117 with an optional linked memory 1115, transceivers 1119, and antennas 1121. The processor 1117 may be configured to perform the methods and features described above with reference to FIGS. 1-9. The transceivers 1119 are in communication with the processor 1117 and antennas 1121 to facilitate the transmission and reception of wireless communications. The transceivers 1119 may be configured to generate, transmit, and receive messages such as those described above with reference to FIGS. 1-9. The eNB 1020 is connected to the Mobility Management Entity/Serving GateWay (MME/S-GW) 1030 which includes a processor 1133 with an optional linked memory 1134.

Although not shown in FIG. 10, one or more MTC servers may be connected to the communication system 1000 of FIG. 10. Although FIGS. 10-11 describe an LTE-based system, LTE is described purely by way of example, and the principles described above with reference to FIGS. 1-9 may also be applicable to architectures that include microcell, picocell, femtocell, and/or macrocell base stations, core networks, and/or WTRUs based on technologies such as WiMax, Wireless Broadband (WiBro), Global System for Mobile Communications (GSM), Enhanced Data Rates for GSM Evolution (EDGE) Radio Access Network (GERAN), Institute of Electrical and Electronics Engineers (IEEE) 802.11x, Institute of Electrical and Electronics Engineers (IEEE) 802.15, WLAN, UMTS/UMTS Terrestrial Radio Access Network (UTRAN), LTE-Advanced (LTE-A), Code Division Multiple Access-2000 (CDMA2000), or any other technology that supports M2M communication.

Figure 12A:
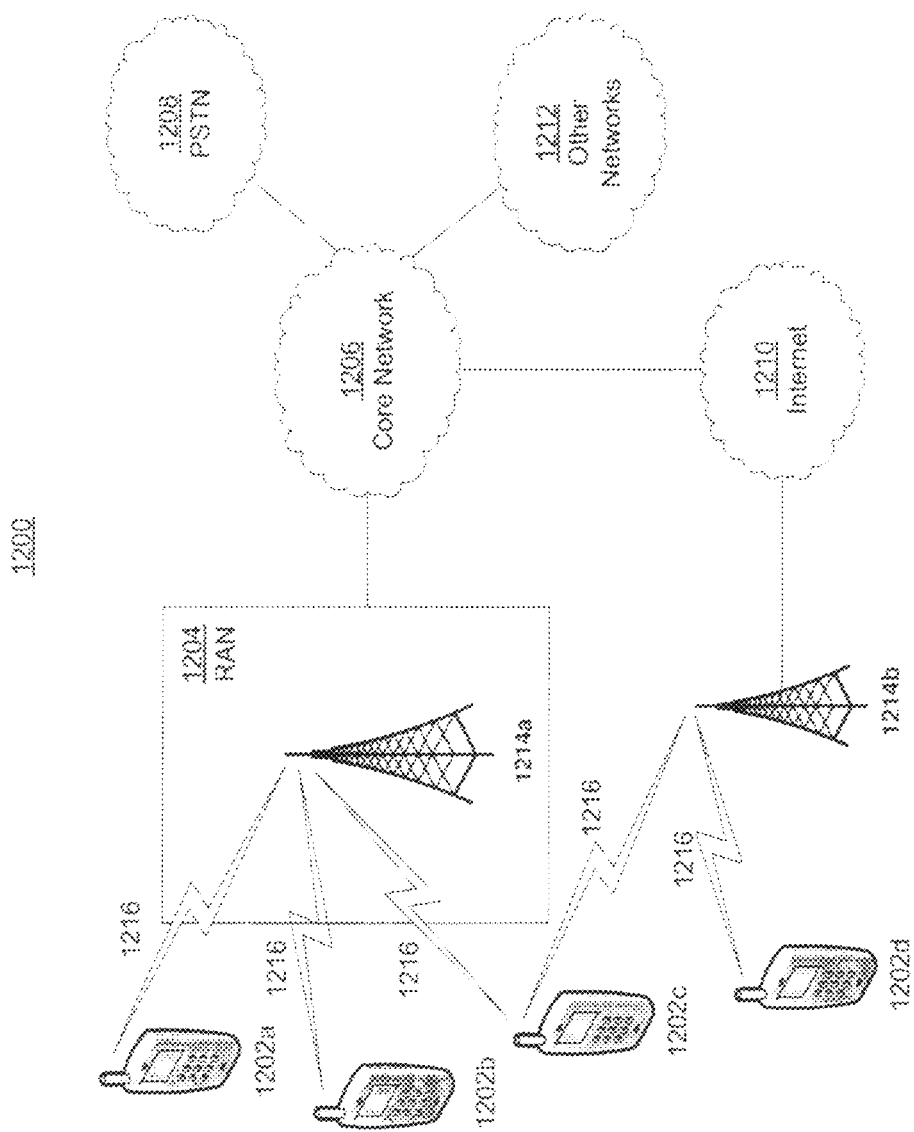
FIG. 12A is a system diagram of an example communications system in which one or more disclosed embodiments may be implemented.

FIG. 12A is a diagram of an example communications system 1200 in which one or more disclosed embodiments may be implemented. The communications system 1200 may be a multiple access system that provides content, such as voice, data, video, messaging, broadcast, etc., to multiple wireless users. The communications system 1200 may enable multiple wireless users to access such content through the sharing of system resources, including wireless bandwidth. For example, the communications systems 1200 may employ one or more channel access methods, such as code division multiple access (CDMA), time division multiple access (TDMA), frequency division multiple access (PIMA), orthogonal FDMA (OFDMA), single-carrier FDMA (SC-FDMA), and the like.

As shown in FIG. 12A, the communications system 1200 may include wireless transmit/receive units (WTRUs) 1202a, 1202b, 1202c, 1202d, a radio access network (RAN) 1204, a core network 1206, a public switched telephone network (PSTN) 1208, the Internet 1210, and other networks 1212, though it will be appreciated that the disclosed embodiments contemplate any number of WTRUs, base stations, networks, and/or network elements. Each of the WTRUs 1202a, 1202b, 1202c, 1202d may be any type of device configured to operate and/or communicate in a wireless environment. By way of example, the WTRUs 1202a, 1202b, 1202c, 1202d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1200 may also include a base station 1214a and a base station 1214b. Each of the base stations 1214a, 1214b may be any type of device configured to wirelessly interface with at least one of the WTRUs 1202a, 1202b, 1202c, 1202d to facilitate access to one or more communication networks, such as the core network 1206, the Internet 1210, and/or the networks 1212. By way of example, the base stations 1214a, 1214b may be a base transceiver station (BTS), a Node-B, an eNode B, a Home Node B, a Home eNode B, a site controller, an access point (AP), a wireless router, and the like. While the base stations 1214a, 1214b are each depicted as a single element, it will be appreciated that the base stations 1214a, 1214b may include any number of interconnected base stations and/or network elements.

The base station 1214a may be part of the RAN 1204, which may also include other base stations and/or network elements (not shown), such as a base station controller (BSC), a radio network controller (RNC), relay nodes, etc. The base station 1214a and/or the base station 1214b may be configured to transmit and/or receive wireless signals within a particular geographic region, which may be referred to as a cell (not shown). The cell may further be divided into cell sectors. For example, the cell associated with the base station 1214a may be divided into three sectors. Thus, in one embodiment, the base station 1214a may include three transceivers, i.e., one for each sector of the cell. In another embodiment, the base station 1214a may employ multiple-input multiple output (MIMO) technology and, therefore, may utilize multiple transceivers for each sector of the cell.

The base stations 1214a, 1214b may communicate with one or more of the WTRUs 1202a, 1202b, 1202c, 1202d over an air interface 1216, which may be any suitable wireless communication link (e.g., radio frequency (RF), microwave, infrared (IR), ultraviolet (UV), visible light, etc.). The air interface 1216 may be established using any suitable radio access technology (RAT).

More specifically, as noted above, the communications system 1200 may be a multiple access system and may employ one or more channel access schemes, such as CDMA, TDMA, FDMA, OFDMA, SC-FDMA, and the like. For example, the base station 1214a in the RAN 1204 and the WTRUs 1202a, 1202b, 1202c may implement a radio technology such as Universal Mobile Telecommunications System (UMTS) Terrestrial Radio Access (UTRA), which may establish the air interface 1216 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1214a and the WTRUs 1202a, 1202b, 1202c may implement a radio technology such as Evolved UMTS Terrestrial Radio Access (E-UTRA), which may establish the air interface 1216 using Long Term Evolution (LTE) and/or LTE-Advanced (LTE-A). [0149] In other embodiments, the base station 1214a and the WTRUs 1202a, 1202b, 1202c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1214b in FIG. 12A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1214b and the WTRUs 1202c, 1202d may implement a radio technology such as IEEE 802.11 to establish a wireless local area network (WLAN). In another embodiment, the base station 1214b and the WTRUs 1202c, 1202d may implement a radio technology such as IEEE 802.15 to establish a wireless personal area network (WPAN). In yet another embodiment, the base station 1214b and the WTRUs 1202c, 1202d may utilize a cellular-based RAT (e.g., WCDMA, CDMA2000, GSM, LTE, LTE-A, etc.) to establish a picocell or femtocell. As shown in FIG. 12A, the base station 1214b may have a direct connection to the Internet 1210. Thus, the base station 1214b may not be required to access the Internet 1210 via the core network 1206.

The RAN 1204 may be in communication with the core network 1206, which may be any type of network configured to provide voice, data, applications, and/or voice over internet protocol (VoIP) services to one or more of the WTRUs 1202a, 1202b, 1202c, 1202d. For example, the core network 1206 may provide call control, billing services, mobile location-based services, pre-paid calling, Internet connectivity, video distribution, etc., and/or perform high-level security functions, such as user authentication. Although not shown in FIG. 12A, it will be appreciated that the RAN 1204 and/or the core network 1206 may be in direct or indirect communication with other RANs that employ the same RAT as the RAN 1204 or a different RAT. For example, in addition to being connected to the RAN 1204, which may be utilizing an EUTRA radio technology, the core network 1206 may also be in communication with another RAN (not shown) employing a GSM radio technology.

The core network 1206 may also serve as a gateway for the WTRUs 1202a, 1202b, 1202c, 1202d to access the PSTN 1208, the Internet 1210, and/or other networks 1212. The PSTN 1208 may include circuit-switched telephone networks that provide plain old telephone service (POTS). The Internet 1210 may include a global system of interconnected computer networks and devices that use common communication protocols, such as the transmission control protocol (TCP), user datagram protocol (UDP) and the internet protocol (IP) in the TCP/IP internet protocol suite. The networks 1212 may include wired or wireless communications networks owned and/or operated by other service providers. For example, the networks 1212 may include another core network connected to one or more RANs, which may employ the same RAT as the RAN 1204 or a different RAT.

Some or all of the WTRUs 1202a, 1202b, 1202c, 1202d in the communications system 1200 may include multi-mode capabilities, i.e., the WTRUs 1202a, 1202b, 1202c, 1202d may include multiple transceivers for communicating with different wireless networks over different wireless links. For example, the WTRU 1202c shown in FIG. 12A may be configured to communicate with the base station 1214a, which may employ a cellular-based radio technology, and with the base station 1214b, which may employ an IEEE 802 radio technology.

Figure 12B:
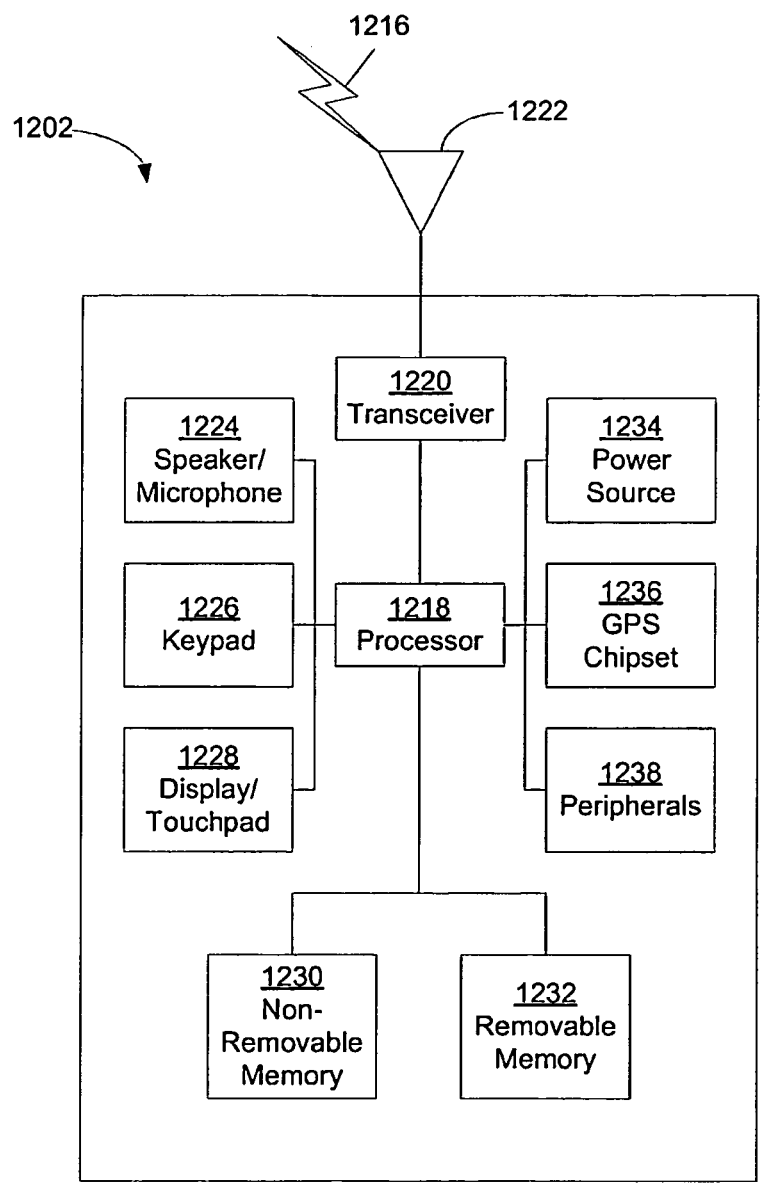
FIG. 12B is a system diagram of an example wireless transmit/receive unit (WTRU) that may be used within the communications system illustrated in FIG. 12A.

FIG. 12B is a system diagram of an example WTRU 1202. As shown in FIG. 12B, the WTRU 1202 may include a processor 1218, a transceiver 1220, a transmit/receive element 1222, a speaker/microphone 1224, a keypad 1226, a display/touchpad 1228, non-removable memory 1206, removable memory 1232, a power source 1234, a global positioning system (GPS) chipset 1236, and other peripherals 1238. It will be appreciated that the WTRU 1202 may include any sub-combination of the foregoing elements while remaining consistent with an embodiment. [0155] The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1202 to operate in a wireless environment. The processor 1218 may be coupled to the transceiver 1220, which may be coupled to the transmit/receive element 1222. While FIG. 12B depicts the processor 1218 and the transceiver 1220 as separate components, it will be appreciated that the processor 1218 and the transceiver 1220 may be integrated together in an electronic package or chip.

The transmit/receive element 1222 may be configured to transmit signals to, or receive signals from, a base station (e.g., the base station 1214*a*) over the air interface 1216. For example, in one embodiment, the transmit/receive element 1222 may be an antenna configured to transmit and/or receive RF signals. In another embodiment, the transmit/receive element 1222 may be an emitter/detector configured to transmit and/or receive IR, UV, or visible light signals, for example. In yet another embodiment, the transmit/receive element 1222 may be configured to transmit and receive both RF and light signals. It will be appreciated that the transmit/receive element 1222 may be configured to transmit and/or receive any combination of wireless signals.

In addition, although the transmit/receive element 1222 is depicted in FIG. 12B as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1216.

The transceiver 1220 may be configured to modulate the signals that are to be transmitted by the transmit/receive element 1222 and to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1206 and/or the removable memory 1232. The non-removable memory 1206 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In other embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1218 may also be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1216 from a base station (e.g., base stations 1214*a*, 1214*b*) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, an e-compass, a satellite transceiver, a digital camera (for photographs or video), a universal serial bus (USB) port, a vibration device, a television transceiver, a hands free headset, a Bluetooth@ module, a frequency modulated (FM) radio unit, a digital music player, a media player, a video game player module, an Internet browser, and the like.

Figure 12C:
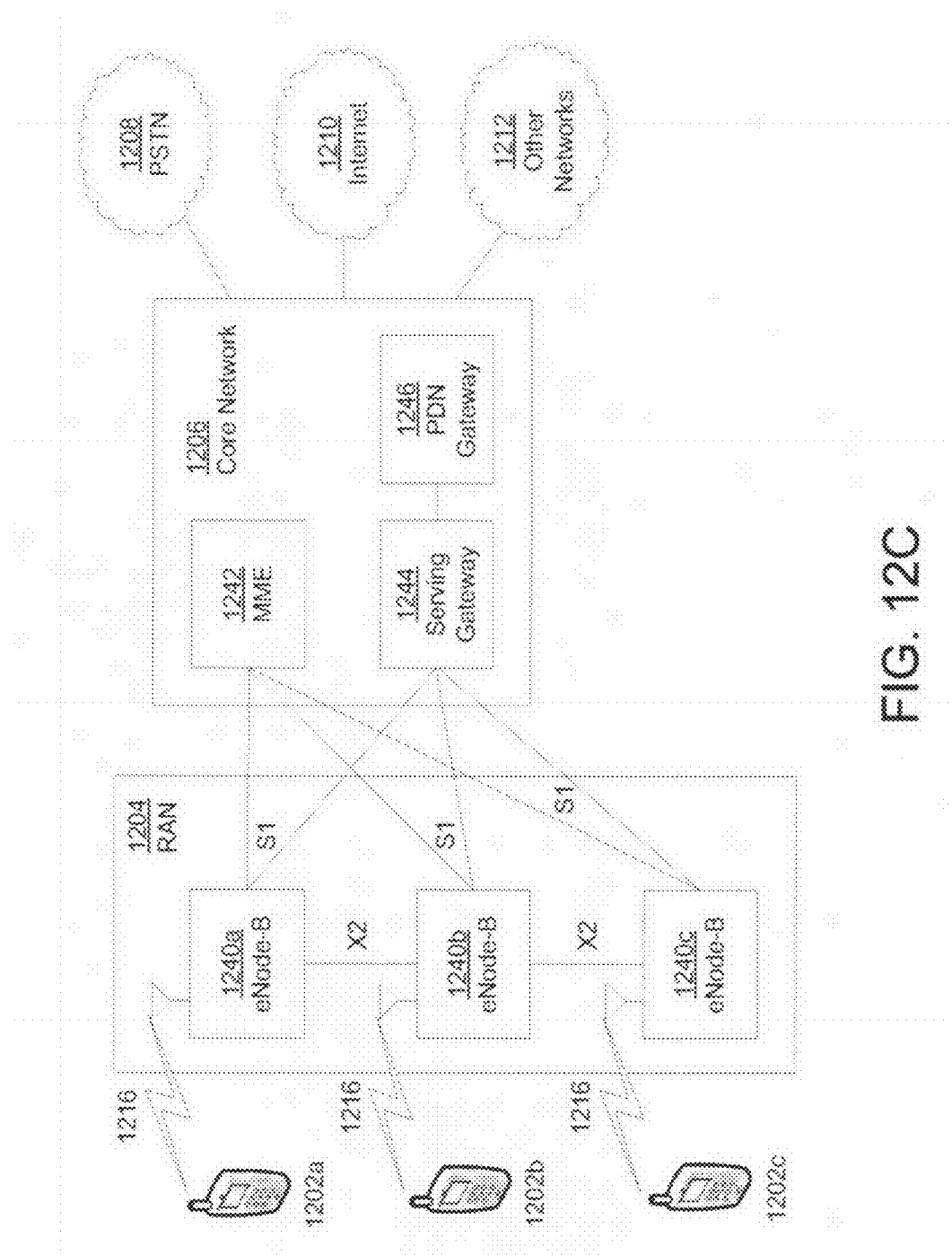
FIG. 12C is a system diagram of an example radio access network and an example core network that may be used within the communications system illustrated in FIG. 12A.

FIG. 12C is a system diagram of the RAN 1204 and the core network 1206 according to an embodiment. As noted above, the RAN 1204 may employ an EUTRA radio technology to communicate with the WTRUs 1202*a*, 1202*b*, 1202*c* over the air interface 1216. The RAN 1204 may also be in communication with the core network 1206.

The RAN 1204 may include eNode-Bs 1240*a*, 1240*b*, 1240*c*, though it will be appreciated that the RAN 1204 may include any number of eNode-Bs while remaining consistent with an embodiment. The eNode-Bs 1240*a*, 1240*b*, 1240*c* may each include one or more transceivers for communicating with the WTRUs 1202*a*, 1202*b*, 1202*c* over the air interface 1216. In one embodiment, the eNode-Bs 1240*a*, 1240*b*, 1240*c* may implement MIMO technology. Thus, the eNode-B 1240*a*, for example, may use multiple antennas to transmit wireless signals to, and receive wireless signals from, the WTRU 1202*a*.

Each of the eNode-Bs 1240*a*, 1240*b*, 1240*c* may be associated with a particular cell (not shown) and may be configured to handle radio resource management decisions, handover decisions, scheduling of users in the uplink and/or downlink, and the like. As shown in FIG. 12C, the eNode-Bs 1240*a*, 1240*b*, 1240*c* may communicate with one another over an X2 interface.

The core network 1206 shown in FIG. 12C may include a mobility management gateway (MMIE) 1242, a serving gateway 1244, and a packet data network (PDN) gateway 1246. While each of the foregoing elements are depicted as part of the core network 1206, it will be appreciated that any one of these elements may be owned and/or operated by an entity other than the core network operator.

The MME 1242 may be connected to each of the eNode-Bs 1242a, 1242b, 1242c in the RAN 1204 via an Si interface and may serve as a control node. For example, the MME 1242 may be responsible for authenticating users of the WTRUs 1202a, 1202b, 1202c, bearer activation/deactivation, selecting a particular serving gateway during an initial attach of the WTRUs 120a, 1202b, 1202c, and the like. The MME 1242 may also provide a control plane function for switching between the RAN 1204 and other RANs (not shown) that employ other radio technologies, such as GSM or WCDMA.

The serving gateway 1244 may be connected to each of the eNode Bs 1240a, 1240b, 1240c in the RAN 1204 via the Si interface. The serving gateway 1244 may generally route and forward user data packets to/from the WTRUs 1202a, 1202b, 1202c. The serving gateway 1244 may also perform other functions, such as anchoring user planes during inter-eNode B handovers, triggering paging when downlink data is available for the WTRUs 1202a, 1202b, 1202c, managing and storing contexts of the WTRUs 1202a, 1202b, 1202c, and the like.

The serving gateway 1244 may also be connected to the PDN gateway 1246, which may provide the WTRUs 1202a, 1202b, 1202c with access to packet-switched networks, such as the Internet 1210, to facilitate communications between the WTRUs 1202a, 1202b, 1202c and IP-enabled devices.

The core network 1206 may facilitate communications with other networks. For example, the core network 1206 may provide the WTRUs 1202a, 1202b, 1202c with access to circuit-switched networks, such as the PSTN 1208, to facilitate communications between the WTRUs 1202a, 1202b, 1202c and traditional land-line communications devices. For example, the core network 1206 may include, or may communicate with, an IP gateway (e.g., an IP multimedia subsystem (IMS) server) that serves as an interface between the core network 1206 and the PSTN 1208. In addition, the core network 1206 may provide the WTRUs 1202a, 1202b, 1202c with access to the networks 1212, which may include other wired or wireless networks that are owned and/or operated by other service providers.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method to provide assistance across networks using different radio access technologies, the method comprising:
    collecting first information from a first device associated with a first network, wherein the first information is received from the first device over a first radio access technology via a control interface;
    collecting second information from a second device associated with a second network, wherein the second information is received from the second device over a second radio access technology via the control interface, wherein the control interface is common to the first network and the second network;
    sending, via the first radio access technology and based on the first information and the second information, an instruction to the first device to measure an operating channel associated with the second network; and
    collecting, from the first device and via the first radio access technology, a measurement of the operating channel associated with the second network, wherein the measurement indicates interference on the operating channel,
    wherein the first information comprises a location of the first device and the second information comprises a location of the second device.

2. The method of claim 1, further comprising sending an instruction to the second device to switch a configuration.

3. The method of claim 2, wherein the instruction to the second device to switch the configuration indicates that the second device switch channels.

4. The method of claim 1, further comprising determining that the first device and the second device are collocated.

5. The method of claim 1, wherein the first information comprises operating characteristics of the first network and the second information comprises operating characteristics of the second network.

6. The method of claim 5, further comprising fusing the first information and the second information.

7. The method of claim 1, wherein the first network is a Wi-Fi network and the second network is a ZigBee® network.

8. The method of claim 7, wherein the instruction causes the first device to perform the measurement using a ZigBee®-specific sensing algorithm.

9. A centralized gateway (CGW) to provide assistance across networks using different radio access technologies, the CGW comprising:
    a receiver configured to:
        collect first information from a first device associated with a first network, wherein the first information is received from the first device over a first radio access technology via a control interface, and
        collect second information from a second device associated with a second network, wherein the second information is received from the second device over a second radio access technology via the control interface, wherein the control interface is common to the first network and the second network; and
    a processor configured to send, via the first radio access technology and based on the first information and the second information, an instruction to the first device via a transmitter to measure an operating channel associated with the second network,
    wherein the receiver is further configured to collect, from the first device and via the first radio access technology, a measurement of the operating channel associated with the second network, wherein the measurement indicates interference on the operating channel, and
    wherein the first information comprises a location of the first device and the second information comprises a location of the second device.

10. The CGW of claim 9, wherein the processor is further configured to send an instruction to the second device via the transmitter to switch a configuration.

11. The CGW of claim 10, wherein the instruction to the second device to switch the configuration indicates that the second device switch channels.

12. The CGW of claim 9, wherein the processor is further configured to determine that the first device and the second device are collocated.

13. The CGW of claim 9, wherein the first information comprises operating characteristics of the first network and the second information comprises operating characteristics of the second network.

14. The CGW of claim 13, wherein the processor is further configured to fuse the first information and the second information.

15. The CGW of claim 9, wherein the first network is a Wi-Fi network and the second network is a ZigBee® network.

16. The CGW of claim 15, wherein the instruction causes the first device to perform the measurement using a ZigBee®-specific sensing algorithm.

* * * * *